(12) United States Patent
Ishizaki et al.

(10) Patent No.: US 12,386,201 B2
(45) Date of Patent: Aug. 12, 2025

(54) EYEGLASS LENS

(71) Applicants: HOYA LENS THAILAND LTD.,
Pathumthani (TH); Takako Ishizaki,
Tokyo (JP); Shigetoshi Kono, Tokyo
(JP)

(72) Inventors: Takako Ishizaki, Tokyo (JP);
Shigetoshi Kono, Tokyo (JP)

(73) Assignee: HOYA LENS THAILAND LTD.,
Pathumthani (TH)

( * ) Notice: Subject to any disclaimer, the term of this patent is extended or adjusted under 35 U.S.C. 154(b) by 442 days.

(21) Appl. No.: 17/778,779

(22) PCT Filed: Dec. 14, 2020

(86) PCT No.: PCT/JP2020/046452
§ 371 (c)(1),
(2) Date: May 20, 2022

(87) PCT Pub. No.: WO2021/131825
PCT Pub. Date: Jul. 1, 2021

(65) Prior Publication Data
US 2022/0397776 A1    Dec. 15, 2022

(30) Foreign Application Priority Data

Dec. 27, 2019   (JP) ................. 2019-237936

(51) Int. Cl.
*G02C 7/06*    (2006.01)
(52) U.S. Cl.
CPC .......... *G02C 7/06* (2013.01); *G02C 2202/24* (2013.01)

(58) Field of Classification Search
CPC .... G02C 2202/24; G02C 7/022; G02C 7/027;
G02C 2202/16; G02C 7/02; G02C 7/024;
G02C 7/06; G02B 1/11; G02B 1/14
See application file for complete search history.

(56) References Cited

U.S. PATENT DOCUMENTS 10,268,050 B2 *   4/2019   To ................. G02C 7/022
2009/0318581 A1   12/2009  Ota et al.
(Continued)

FOREIGN PATENT DOCUMENTS

EP    3640712 A1    4/2020
JP    2019174727 A  10/2019
(Continued)

OTHER PUBLICATIONS

Machine Translation of WO-2019189764-A1 (Year: 2019).*
(Continued)

*Primary Examiner* — Pinping Sun
*Assistant Examiner* — Matthew Y Lee
(74) *Attorney, Agent, or Firm* — Oliff PLC

(57) ABSTRACT

Provided are an eyeglass lens that includes a lens substrate having a plurality of substrate protruding portions that protrude from a substrate base portion on a surface of the lens substrate and a coating film provided so as to cover the plurality of substrate protruding portions, the outermost surface of the eyeglass lens having a plurality of convex portions and concave portions, in which the thickness of the coating film varies over the surrounding regions of the substrate protruding portions, and technology related thereto.

11 Claims, 16 Drawing Sheets

(56) References Cited

U.S. PATENT DOCUMENTS

| | | | |
|---|---|---|---|
| 2016/0306192 A1* | 10/2016 | Marshall | G02B 3/0043 |
| 2017/0131567 A1 | 5/2017 | To et al. | |
| 2018/0267207 A1* | 9/2018 | Takenaka | B29C 45/14336 |
| 2019/0033619 A1* | 1/2019 | Neitz | G02C 7/02 |
| 2020/0132441 A1 | 4/2020 | Uchidani et al. | |
| 2020/0198267 A1 | 6/2020 | Ishizaki et al. | |
| 2021/0356763 A1* | 11/2021 | Le Saux | G02C 7/022 |
| 2021/0373357 A1 | 12/2021 | Guillot et al. | |
| 2022/0057293 A1 | 2/2022 | Qi et al. | |

FOREIGN PATENT DOCUMENTS

| | | | |
|---|---|---|---|
| JP | 2019179136 A | 10/2019 | |
| JP | 2020106712 A | 7/2020 | |
| KR | 890700850 A | 4/1989 | |
| WO | 8808340 A1 | 11/1988 | |
| WO | 2019189847 A1 | 10/2019 | |
| WO | WO-2019189764 A1 * | 10/2019 | ....... B29D 11/00009 |

OTHER PUBLICATIONS

PCT/JP2020/046452, "International Preliminary Report on Patentability", Jul. 7, 2022, 9 pages.
PCT/JP2020/046452, "English Translation of International Search Report", Feb. 22, 2021, 2 pages.

* cited by examiner

Example 6

Example 7
Defocus power of substrate protruding portion: 3.50D
Thickness of coating film at coating film base portion: 2.0μm
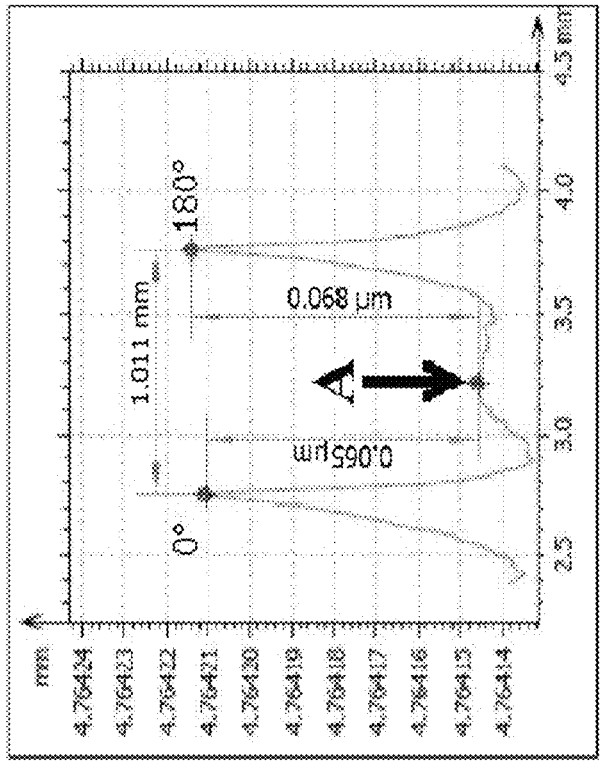
FIG. 16A Left-right cross-section
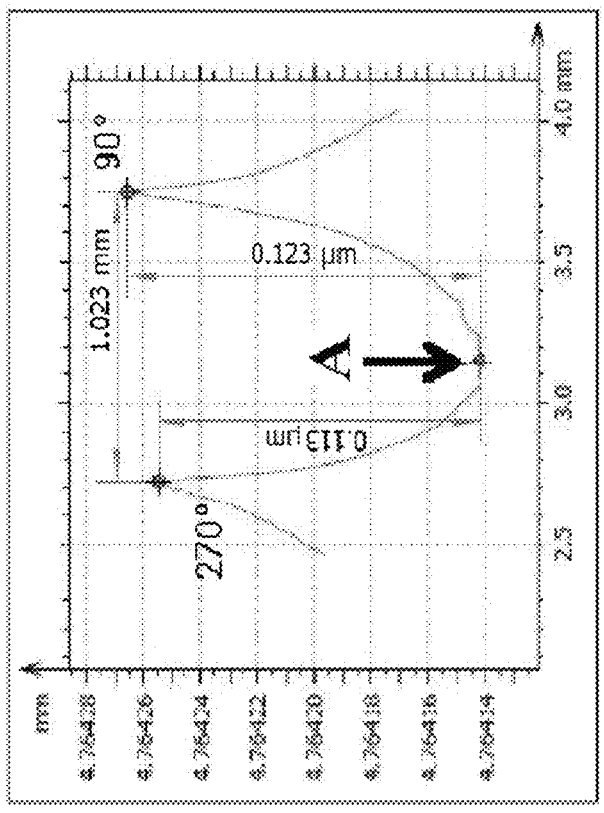
FIG. 16B Vertical cross-section
A: Vertex of coating film convex portion

Example 8

EYEGLASS LENS

CROSS-REFERENCE TO RELATED APPLICATIONS

This application is the National Stage of International Application No. PCT/JP2020/046452 filed Dec. 14, 2020, which claims priority to Japanese Patent Application No. 2019-237936, filed Dec. 27, 2019, and the contents of which is incorporated by references.

TECHNICAL FIELD

The present disclosure relates to an eyeglass lens.

BACKGROUND ART

Patent Document 1 discloses an eyeglass lens for suppressing the progression of a refractive error such as near-sightedness. Specifically, for example, minute spherical convex portions (substrate protruding portions in this specification) with a diameter of about 1 mm are formed on a convex surface, which is the object-side surface of the eyeglass lens. With an eyeglass lens, normally, luminous flux that has entered from the object-side surface is emitted from the eyeball-side surface and is then focused on the wearer's retina. On the other hand, luminous flux that has passed through the minute convex portions is focused at a position closer to the object (front side) than the wearer's retina is. As a result, the progression of near-sightedness is suppressed.

CITATION LIST

Patent Documents

Patent Document 1: US 2017/0131567A

SUMMARY OF DISCLOSURE

Technical Problem

If a coating film is formed on a surface (a convex surface, which is the object-side surface), which is provided with the minute convex portions, of the eyeglass lens disclosed in Patent Document 1, the coating film covers the surface that has the minute convex portions.

If no coating film is provided, the minute convex portions cause luminous flux to converge at a position that is closer to the object than a predetermined position A is. However, if a coating film is formed on a lens substrate, the shape of the outermost surface of the coating film (i.e., an eyeglass lens) in a surrounding region of a minute convex portion, that is, a substrate protruding portion that protrudes from a substrate base portion deviates from the shape of the vicinity of a boundary between the substrate base portion and the substrate protruding portion of the lens substrate (simply referred to as "boundary vicinity" hereinafter). This deviation causes luminous flux entering the boundary vicinity to become stray light.

An example of the present disclosure aims to provide a technique for suppressing the generation of stray light even when a coating film is provided so as to cover substrate protruding portions on a lens substrate that contribute to the effect of suppressing near-sightedness.

Solution to Problem

The inventors of the present disclosure conducted intensive studies in order to resolve the above issues. The inventors of the present disclosure focused on a method for forming a coating film. First, the inventors focused on a conventional spin coating method as the method for forming a coating film. If a spin coating method is adopted, the coating film in the vicinity of the boundary between the substrate base portion and the substrate protruding portion has a uniform thickness. The inventors inferred that this uniform thickness would contribute to suppressing stray light. However, with a conventional spin coating method, the generation of stray light was not suppressed (although a spin coating method, which is not a conventional method, can suppress the generation of stray light, this point will be described later).

In view of this, from a different point of view, the inventors of the present disclosure focused on, as a method for forming a coating film, a dipping method (immersion method) with which it is more difficult to control the thickness of a coating film compared to a spin coating method and the obtained coating film is likely to have a non-uniform thickness. Adopting a dipping method unexpectedly resulted in the suppression of the generation of stray light.

As a result of further intensive studies based on this finding, it was found that, on the premise that an eyeglass lens can suppress progression of near-sightedness, the generation of stray light can be suppressed by varying the thickness of the coating film over the surrounding region of each substrate protruding portion, regardless of the method for forming the coating film.

Specifically, an eyeglass lens can suppress the progression of near-sightedness, and thus, even if an eyeglass lens has a portion where the coating film is thick in the surrounding region of each substrate protruding portion, that is, even if an eyeglass lens has a portion whose shape largely deviates from the shape of the vicinity of the boundary between a substrate base portion and the substrate protruding portion of the lens substrate, the outermost surface of the eyeglass lens at least has convex portions and concave portions, and the effect of suppressing the progression of near-sightedness due to the substrate protruding portions is exhibited as disclosed in Patent Document 1.

With the spin coating method that the inventors of the present disclosure first focused on, portions with a large degree of deviation are evenly present over the surrounding regions of the substrate protruding portions. On the other hand, according to an aspect of the present disclosure, portions with a thin coating film are present in surrounding regions of substrate protruding portions, that is, portions whose shape has a small degree of deviation from the shape of the vicinity of the boundary between a substrate base portion and a substrate protruding portion of the lens substrate are present. The eyeglass lens obtained using the spin coating method is significantly different from an eyeglass lens obtained using a conventional spin coating method in that portions with a small degree of deviation are present.

With an aspect of the present disclosure, portions with a large degree of deviation in the shape of the coating film are present in the vicinities of the boundaries between the substrate base portion and the substrate protruding portions. However, such portions are present only in some of the vicinities thereof. Also, if a dipping method is adopted, for example, a portion with a large degree of deviation has the equivalent degree of deviation of a portion obtained using a conventional spin coating method. Furthermore, according to an aspect of the present disclosure, portions with a small degree of deviation are present at other portions, and thus the generation of stray light is further suppressed, compared to an eyeglass lens obtained using a conventional spin coating method. To be precise, the present disclosure aims to suppress the generation of stray light, compared to a case where a conventional spin coating method is applied to a lens substrate.

If a dipping method is adopted, when coating film liquid flows down under its own weight, variation in the thickness of the coating film occurs over surrounding regions of the substrate protruding portions, and there are portions where the coating film liquid quickly flows down and portions where the coating film liquid is likely to pool. Accordingly, there is a difference in the magnitude of the degree of deviation from the shape of the boundary vicinity over a surrounding region of a substrate protruding portion. Regardless of the dipping method, even when an aspect of the present disclosure is realized using another method, which will be described later, it is possible to make a difference in the magnitude of the degree of deviation, and thus to further suppress the generation of stray light, compared to an eyeglass lens obtained using the conventional spin coating method.

The present disclosure was made based on the above findings.

A first aspect according to the present disclosure is an eyeglass lens including:
- a lens substrate having a plurality of substrate protruding portions that protrude from a substrate base portion on a surface of the lens substrate; and
- a coating film provided so as to cover the plurality of substrate protruding portions,
- the outermost surface of the eyeglass lens having a plurality of convex portions and concave portions,
- in which the thickness of the coating film varies over surrounding regions of the substrate protruding portions.

A second aspect according to the present disclosure is the aspect according to the first aspect,
- in which, when each substrate protruding portion is viewed in a plan view, the coating film is thin in a region extending in a predetermined direction in the surrounding region of the substrate protruding portion and a region extending in the opposite direction to the predetermined direction, and a portion with a thick coating film is present in a region extending in other directions.

A third aspect according to the present disclosure is the aspect according to the first or second aspect,
- in which, in more than 50% of all of the coating film convex portions,
- when, on a plot with a rotation angle of 0 to 360 degrees on a horizontal axis and the thickness of the coating film on a vertical axis with respect to a base of the coating film convex portion, the angle at which the thickness of the coating film is at the smallest value is set as a rotation angle of 0 degrees,
- the film thickness that is larger than the smallest value and is at the minimal value is the film thickness at the base where the rotation angle is in a range of 165 to 195 degrees.

A fourth aspect according to the present disclosure is the aspect according to any one of the first to third aspects,
- in which, in more than 50% of all of the coating film convex portions,
- when, on a plot with a rotation angle of 0 to 360 degrees on a horizontal axis and the thickness of the coating film on a vertical axis with respect to a base of the coating film convex portion, the angle at which the thickness of the coating film is at the smallest value is set as a rotation angle of 0 degrees,
- the film thickness that is at the largest value and the maximal value is the film thickness at the base where the rotation angle is in a range of 50 to 110 degrees or the film thickness at the base where the rotation angle is in a range of 250 to 310 degrees, and the film thickness that is smaller than the largest value and is at the maximal value is present in a range of rotation angles where the largest value is not present.

A fifth aspect according to the present disclosure is the aspect according to any one of the first to fourth aspects,
- in which a value obtained by dividing the smallest value of the thickness of the coating film extending over surrounding regions of more than 50% of all of the substrate protruding portions (at a rotation angle of 0 to 360 degrees) by the largest value of the thickness of the coating film (the smallest value/the largest value) is in a range of 0.10 to 0.99.

A sixth aspect according to the present disclosure is the aspect according to any one of the first to fifth aspects,
- in which, on a cross-section of the lens that includes centers of more than 50% of all of the coating film convex portions, (the smallest value of difference values expressed by (the largest value of the thickness of the coating film−the thickness of the coating film at a vertex of the coating film convex portion)/the largest value of difference values expressed by (the largest value of the thickness of the coating film−the thickness of the coating film at the vertex of the coating film convex portion)) is 0.90 or less.

A seventh aspect according to the present disclosure is the aspect according to any one of the first to sixth aspects,
- in which the smallest value of the thickness of the film provided at bases of more than 50% of all of the substrate protruding portions is 0.01 to 2.00 times the film thickness of a coating film base portion.

An eighth aspect according to the present disclosure is the aspect according to any one of the first to seventh aspects,
- in which defocus power of more than 50% of all of the coating film convex portions is in a range of 2.50 D to 6.50 D.

A ninth aspect according to the present disclosure is the aspect according to any one of the first to eighth aspects,
- in which refractive power of more than 50% of all of the substrate protruding portions is in a range of 2.50 D to 6.50 D.

A tenth aspect according to the present disclosure is the aspect according to any one of the first to ninth aspects,
- in which the thickness of the coating film of more than 50% of all of the coating film convex portions is in a range of 0.5 to 6.0 µm.

An eleventh aspect according to the present disclosure is the aspect according to any one of the first to tenth aspects,
- in which the eyeglass lens is able to suppress progression of near-sightedness.

Other aspects according to the present disclosure are as follows.

The stray light ratio may be set to more than 0% (or 0% or more, or 2% or more) and 20% or less. Furthermore, it is preferable to reduce the stray light ratio, and thus the stray light ratio is preferably set to 30% or less or 20% or less, more preferably set to 15% or less (even more preferably less than 15%), and further preferably set to 10% or less (preferably less than 10%).

The "stray light ratio" in this specification is obtained by setting, as the smallest unit, a circular region (with a diameter of 4.0 mm, for example) that includes the entirety of another coating film convex portion located at the shortest distance from one coating film convex portion centered on the one coating film convex portion (i.e., a substrate protruding portion), and performing measurement on the smallest unit.

The eyeglass lens according to this specification includes a plurality of the smallest units. If the stray light ratio in at least one of the smallest units of the eyeglass lens satisfies the above numerical range, effects of the present disclosure are exhibited. It is preferable that more than 50%, 80% or more, 90% or more, or 95% or more of the plurality of smallest units satisfy the specified stray light ratio in a suitable order.

With regard to the following specified values, more than 50% of all of the coating film convex portions (or more than 50% of all of the substrate protruding portions) preferably satisfy the following specified values. More favorably, 80% or more, 90% or more, 95% or more, or 99% or more of the coating film convex portions satisfy the specified values in a suitable order.

The height of a substrate protruding portion may be in a range of 0.1 to 10 μm, for example, or may be in a range of 0.5 to 2 μm (corresponding to a refractive power of 2.50 D to 6.50 D of a substrate protruding portion). The upper limit of the refractive power of the substrate protruding portion may be 5.50 D or 5.00 D, and the lower limit may be 3.00 D.

The film thickness of the coating film may be in a range of 0.1 to 100 μm (preferably 0.5 to 6.0 μm, and more preferably 1.0 to 5.0 μm), for example. The range of the film thickness may be applied to a film thickness of a coating film base portion.

A plot with a rotation angle of 0 to 360 degrees on the horizontal axis and the thickness of the coating film on the vertical axis with respect to the base of a coating film convex portion is focused on. On this plot, the angle at which the thickness of the coating film is at the smallest value (and favorably also at a minimal value) may be set to a rotation angle of 0 degrees.

In that case, the film thickness that is larger than the smallest value and is at the minimal value is preferably the film thickness at the base where the rotation angle is in a range of 165 to 195 degrees.

It is preferable that the film thickness that is at the largest value and the maximal value is the film thickness at the base at a rotation angle of 50 to 110 (preferably 60 to 100) degrees, or the film thickness at the base at a rotation angle of 250 to 310 (preferably 260 to 300) degrees. Also, the film thickness that is smaller than the largest value and is at the maximal value is preferably present in a range of rotation angles where the largest value is not present.

It is preferable that a value obtained by dividing the smallest value of the thickness of a coating film extending over surrounding regions of substrate protruding portions (at a rotation angle of 0 to 360 degrees) by the largest value of the thickness of the coating film (the smallest value/the largest value) is in a range of 0.10 to 0.99. The lower limit may be 0.20, 0.30, 0.40, 0.50, 0.60, 0.70, 0.80, 0.90, or 0.92. The upper limit may either be 0.98 or 0.97.

On a cross-section of the lens that includes centers of the coating film convex portions, (the smallest value of difference values expressed by (the largest value of the thickness of the coating film–the thickness of the coating film at vertexes of coating film convex portions)/the largest value of difference values expressed by (the largest value of the thickness of the coating film–the thickness of the coating film at vertexes of coating film convex portions)) (Equation 1 hereinafter) is preferably 0.90 (or 0.85, 0.80, 0.75, or 0.60) or less. There is no limitation on the lower limit, and examples of the lower limit include 0.10, 0.20, 0.30, 0.40, or 0.50.

The smallest value of the thickness of the film provided at the bases of the substrate protruding portions is preferably 0.01 to 2.00 times the film thickness of the coating film base portion. The lower limit may be 0.10, 0.20, 0.30, 0.40, 0.50, 0.60, 0.70, 0.80, 0.90, or 1.05. The upper limit may be 1.90, 1.80, 1.70, 1.60, 1.50, 1.40, 1.30, or 1.20.

Similarly to the substrate protruding portions, the height of the coating film convex portion may be in a range of 0.1 to 10 μm, for example, and is preferably in a range of 0.5 to 2 μm. Similarly to the substrate protruding portions, the defocus power of the coating film convex portion may be a refractive power of 2.50 D to 6.50 D of the substrate protruding portion. The upper limit of the defocus power may be 5.50 D or 5.00 D, and the lower limit may be 3.00 D.

Advantageous Effects of Disclosure

According to an example of the present disclosure, it is possible to suppress the generation of stray light even when a coating film is provided so as to cover substrate protruding portions on a lens substrate that contributes to the effect of suppressing near-sightedness.

BRIEF DESCRIPTION OF DRAWINGS

FIG. 16A is a diagram showing a plot of the thickness of a coating film on a cross-section of the lens in a left-right (horizontal) direction in Example 7. FIG. 16B is a diagram showing a plot of the thickness of a coating film on a cross-section of the lens in the up-down direction in Example 7.

DESCRIPTION OF EMBODIMENTS

Figure 1B:
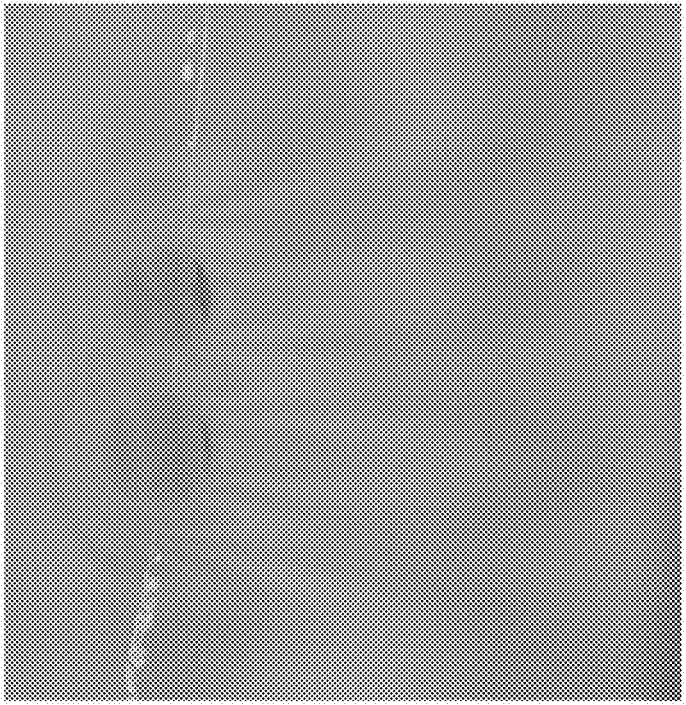
FIG. 1B is a photograph showing results obtained by examining the flux of a coating film liquid using an optical microscope when a lens substrate on which two substrate protruding portions were arranged side-by-side was immersed in the coating film liquid and was then pulled up.

The following describes embodiments of the present disclosure. The following description that is based on the drawings is exemplary, and the present disclosure is not limited to the aspects that are described as examples.

An eyeglass lens according to this specification has an object-side surface and an eyeball-side surface. The "object-side surface" is the surface that is located on the object side when a wearer wears glasses including the eyeglass lens. The "eyeball-side surface" is the surface that is located on the opposite side, that is, the eyeball side, when the wearer wears the glasses including the eyeglass lens. This relationship also applies to the lens substrate that is to be the base of an eyeglass lens. That is, the lens substrate includes an object-side surface and an eyeball-side surface.

In this specification, when the eyeglass lens is viewed in a front view, the left-right (horizontal) direction is set as the X-direction, the up-down direction is set as the Y-direction, and the thickness direction of the lens and the direction in which an optical axis extends are set as the Z-direction.

In this specification, in a state where the eyeglass lens is worn, out of the top and bottom directions, the top direction is referred to as "upward" in the Y-direction (the zero-o'clock direction with a rotation angle of 0 degrees when viewed from the center of the eyeglass lens), and the opposite direction is referred to as "downward" in the Y-direction (the six-o'clock direction with a rotation angle of 180 degrees). The top-bottom direction refers to a direction perpendicular to the direction of an optical axis (Z-direction) of the eyeglass lens when the wearer faces forward, and is also referred to as a "vertical direction". The X-direction refers to the horizontal direction, and is perpendicular to the Y-direction and the Z-direction.

Note that the lens center indicates the optical center or the geometric center of the eyeglass lens. In this specification, a case where the optical center substantially matches the geometric center will be described.

<Method for Manufacturing Eyeglass Lens>

A method for manufacturing an eyeglass lens according to an aspect of the present disclosure is as follows.

"A method for manufacturing an eyeglass lens that includes a lens substrate having a plurality of substrate protruding portions that protrude from a substrate base portion on a surface of the lens substrate and a coating film provided so as to cover the plurality of substrate protruding portions, the outermost surface of the eyeglass lens having a plurality of convex portions and concave portions, the method including forming the coating film by immersing the lens substrate in a coating film liquid, pulling up the lens substrate, and drying the coating film liquid on the lens substrate while or after the coating film liquid flows under its own weight."

There is no limitation on the lens substrate as long as it includes a substrate base portion and a plurality of substrate protruding portions that protrude from the substrate base portion.

The substrate base portion refers to a portion with a shape that can realize a power of the wearer's prescription.

The substrate protruding portion refers to a portion that corresponds to a minute convex portion disclosed in Patent Document 1. An eyeglass lens according to an aspect of the present disclosure can suppress the progression of near-sightedness. As a result, the lens substrate can suppress the progression of near-sightedness. Similarly to the minute convex portions in Patent Document 1, a plurality of substrate protruding portions according to one aspect of the present disclosure may be formed on at least the object-side surface or the eyeball-side surface of a lens substrate, and this state is referred to as "protruding from the substrate base portion on the surface of the lens substrate". In this specification, a case where a plurality of substrate protruding portions are only provided on the object-side surface of the lens substrate will mainly be described.

Figure 1A:
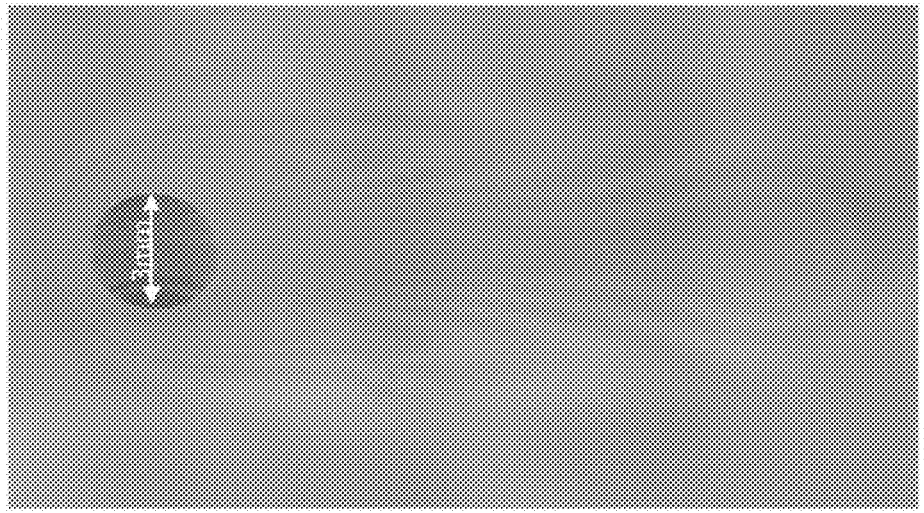
FIG. 1A is a photograph showing results obtained by examining the flux of a coating film liquid using an optical microscope when a lens substrate provided with only one substrate protruding portion with a diameter of 3 mm was immersed in the coating film liquid and was then pulled up.
Figure 10A:
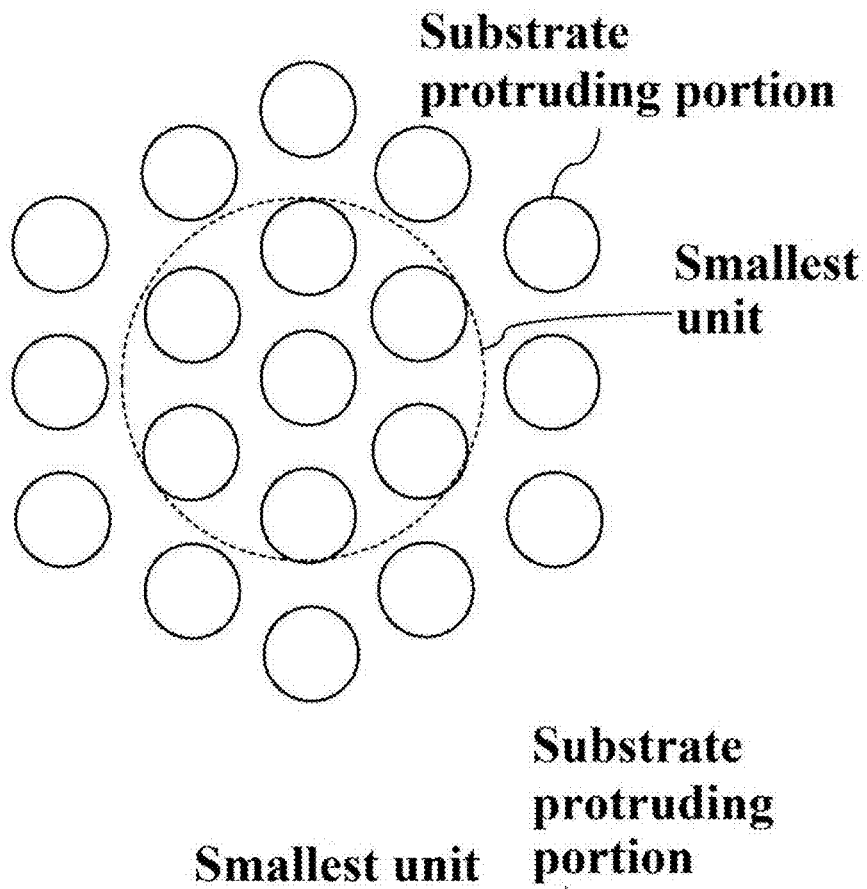
FIG. 10A is a diagram of a case where a discrete arrangement in which the centers of the coating film convex portions independently serve as the vertexes of an equilateral triangle in a plan view (the center of each coating film convex portion is located at a vertex of a honeycomb structure) is adopted.
Figure 10B:
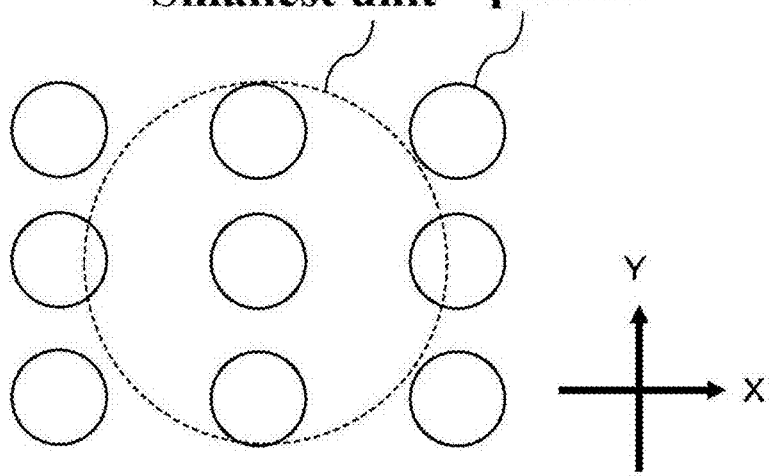
FIG. 10B is a diagram of a case where a structure in which the coating film convex portions are arranged in a row in a plan view is adopted.

As illustrated in FIGS. 10A-10B in Patent Document 1, the substrate protruding portions may be formed at a center portion of the eyeglass lens, or as illustrated in FIGS. 1A-1B in Patent Document 1, the substrate protruding portions need not be formed at the center portion of the eyeglass lens.

Note that a case where a plastic lens substrate or a glass lens substrate is used as the lens substrate will mainly be described in this specification. On the other hand, other substances such as a base film may be laminated on the lens substrate. If another substance is laminated on a lens substrate, convex portions and concave portions resulting from the plurality of substrate protruding portions will be present on the lens substrate, and the plurality of substrate protruding portions can provide the effect of suppressing the progression of near-sightedness even when the other substance is laminated onto the lens substrate.

In one aspect according to the present disclosure, a coating film is formed on the lens substrate. The coating film may be formed on at least a plurality of substrate protruding portions, and it is preferable to form the coating film on both sides of the lens substrate because a dipping method is to be adopted.

With the dipping method in this specification, the lens substrate is immersed in a coating film liquid from the lowermost end thereof and the uppermost end is ultimately immersed therein such that the entire lens substrate is immersed in the coating film liquid, and when the lens substrate is pulled up, the lens substrate is pulled upward in the opposite direction, i.e., in the vertical direction, for example. On the other hand, the lens substrate may be immersed in the coating film liquid in a state where the lens substrate is inclined relative to the up-down direction in the horizontal direction to some extent, and then be pulled up in that state. In either case, the coating film liquid on the lens substrate flows downward along the lens substrate under its own weight.

There is no limitation on the coating liquid as long as a coating film can be formed by immersing lens substrate in the coating film liquid, pulling up the lens substrate, and drying the coating film liquid on the lens substrate while or after the coating film liquid flows under its own weight.

If the volatility of the coating film liquid is relatively high, the lens substrate is immersed in the coating film liquid and pulled up, and drying is completed while the coating film liquid is still flowing under its own weight. On the other hand, if the volatility of the coating film liquid is relatively low, drying is not completed while the coating film liquid is still flowing under its own weight. Thus, after the lens substrate is pulled up, the coating film liquid is dried again so as to form a coating film.

Regardless of the volatility of the coating film liquid, the lens substrate is immersed in the coating film liquid and pulled up, and the coating film liquid somewhat flows under its own weight, which means that the coating film liquid flows downward along the lens substrate. As described in [Solution to Problem], the thickness of the coating film can be varied over surrounding regions of the substrate protruding portions due to the flowing of the coating film liquid.

FIG. 1A is a photograph showing results obtained by examining the flux of a coating film liquid using an optical microscope when a lens substrate provided with only one substrate protruding portion with a diameter of 3 mm was immersed in the coating film liquid and was then pulled up, and FIG. 1B is a photograph showing results obtained by examining the flux of a coating film liquid using an optical microscope when a lens substrate on which two substrate protruding portions were arranged side-by-side was immersed in the coating film liquid and was then pulled up.

As shown in FIG. 1A, the flux of the coating film liquid is relatively low in an upper portion (the vicinity at a rotation angle of 0 degrees) and a lower portion (the vicinity at a rotation angle of 180 degrees) of a surrounding region of a substrate protruding portion. If the coating film liquid is dried in this state, the coating film will be relatively thin in the upper portion and the lower portion of the surrounding region of the substrate protruding portion.

On the other hand, as shown in FIG. 1A as well, the flux of the coating film liquid is relatively large in portions other than the upper portion and the lower portion of the surrounding region of the substrate protruding portion. If the coating film liquid is dried in this state, the coating film will be relatively thick in portions other than the upper portion and the lower portion of the surrounding region of the substrate protruding portion. This trend is also seen in FIG. 1B in which two substrate protruding portions are provided.

As shown in FIG. 1A, even in a case where only one substrate protruding portion is provided, the thickness of the coating film varies over the surrounding region of the substrate protruding portion. Thus, as shown in FIG. 1B, even in a case where multiple substrate protruding portions are provided, of course, the thickness of the coating film varies as described in the items of the examples described later. These results mean that, by adopting the method according to one aspect of the present disclosure, the thickness of the coating film varies, regardless of the number of substrate protruding portions.

Also, even when the type (plastic, glass) and the shape (the size and number of substrate protruding portions) of the lens substrate, the properties (types, viscosity, concentration, volatility) of the coating film liquid, and various conditions (the temperature of the coating film liquid, and the speed at which the lens substrate is pulled up and the film thickness of the coating film accompanying the speed) for the dipping method are changed, the coating film liquid flows under its own weight and thus the thickness of the coating film varies, as long as the dipping method is adopted for a lens substrate provided with the substrate protruding portions. This was confirmed through intensive studies conducted by the inventors of the present disclosure.

With the above method for manufacturing an eyeglass lens according to one aspect of the present disclosure, it is possible to suppress the generation of stray light even when a coating film is provided so as to cover substrate protruding portions on a lens substrate that contributes to the effect of suppressing near-sightedness, and productivity is improved.

The lens substrate, the substrate protruding portions, the coating film, the coating film liquid, specific examples (preferably examples) of various conditions for the dipping method, and a method for measuring a stray light ratio will be described below.

[Lens Substrate]

There is no particular limitation on aspects of the sizes and arrangement of multiple substrate protruding portions on the surface of the lens substrate. There is no limitation on the substrate protruding portions as long as the substrate protruding portions mainly function to cause luminous flux that enters from the object-side surface to be emitted from the eyeball-side surface and to converge on the object side (forward) relative to the retina. The substrate protruding portion can be determined from the viewpoint of external visibility of the substrate protruding portion, designability imparted by the substrate protruding portion, adjustment of the refractive power by the substrate protruding portion, and the like, for example.

There is no limitation on the size of the substrate protruding portions as described above, and the substrate protruding portions are sized or shaped such that the thickness of a coating film formed at the base thereof can be varied. As shown in Example 1 described later and FIG. 1B, the shape thereof may be circular in a plan view, or spherical as a three-dimensional shape, for example. As shown in FIG. 1A, the shape thereof may be an elliptical shape in a plan view, or may also be a toric shape as a three-dimensional shape. The same applies to the shape of a coating film convex portion.

FIG. 10A is a diagram of a case where a discrete arrangement in which the centers of the coating film convex portions independently serve as the vertexes of an equilateral triangle in a plan view (the center of each coating film convex portion is located at a vertex of a honeycomb structure) is adopted, and FIG. 10B is a diagram of a case where a structure in which the coating film convex portions are arranged in a row in a plan view is adopted. A dotted line indicates a circular region that is used to measure a stray light ratio (details thereof will be described later).

As described above, there is no limitation on aspects of the arrangement of the substrate protruding portions. As shown in Example 1 described later and FIG. 10A, a discrete arrangement in which the centers of the substrate protruding portions independently serve as the vertexes of an equilateral triangle in a plan view (the center of each substrate protruding portion is located at a vertex of a honeycomb structure) may be adopted.

As shown in FIG. 10B below, a structure in which the substrate protruding portions are arranged in a row in a plan view may be adopted. Furthermore, a structure in which substrate protruding portions are arranged in a row and other substrate protruding portions are arranged in a row adjacent to the row may be adopted. At that time, the pitch between substrate protruding portions in one row (the distance between the centers of the substrate protruding portions, the same applies to the following), and the pitch between a substrate protruding portion in a given row and a substrate protruding portion in another row that is adjacent to that substrate protruding portion may be different from each other. Also, the interval between substrate protruding portions in one row may be different from the interval between rows that are adjacent to each other.

The height of a substrate protruding portion may be 0.1 to 10 µm, for example, or may be 0.5 to 2 µm (corresponding to a refractive power of 2.50 D to 6.50 D of a substrate protruding portion). The upper limit of the refractive power of the substrate protruding portion may be 5.50 D or 5.00 D, and the lower limit may be 3.00 D. The radius of curvature of the surface of a substrate protruding portion in a plan view (i.e., when the substrate protruding portion is viewed facing the substrate protruding portion in the direction in which an optical axis extends) may be 50 to 250 mmR, for example. Also, the distance between substrate protruding portions that are adjacent to each other (the distance between an end portion of a given substrate protruding portion and an end portion of a substrate protruding portion that is adjacent to this substrate protruding portion) may be substantially the same as the value of the radius of the substrate protruding portion, for example. Also, a plurality of the substrate protruding portions can be arranged substantially uniformly near the lens center, for example.

Various lens substrates that are usually used for an eyeglass lens can be used as the lens substrate. The lens substrate may be a plastic lens substrate or a glass lens substrate, for example. The glass lens substrate may be a lens substrate made of inorganic glass, for example. From the viewpoint of being light in weight and unlikeliness to crack, a plastic lens substrate is preferable as the lens substrate. Examples of the material of the plastic lens substrate include styrene resins such as (meth)acrylic resins, allyl carbonate resins such as polycarbonate resins, allyl resins, and diethylene glycol bis(allyl carbonate) resin (CR-39), vinyl resins, polyester resins, polyether resins, urethan resins obtained through a reaction between an isocyanate compound and a hydroxy compound such as diethylene glycol, thiourethane resins obtained through a reaction between an isocyanate compound and a polythiol compound, and cured products (generally called transparent resins) obtained by curing a curable composition containing a (thio)epoxy compound having one or more disulfide bonds in the molecule. The curable composition may be referred to as a "polymerizable composition". An uncolored lens substrate (colorless lens) or a colored lens substrate (colored lens) may be used as the lens substrate. There is no particular limitation on the thickness and the diameter of the lens substrate. The thickness (central thickness) may be about 1 to 30 mm, and the diameter may be about 50 to 100 mm, for example. The lens substrate may have a refractive index of about 1.60 to 1.75, for example. However, the refractive index of the lens substrate is not limited to the above-mentioned range, and may be within the above-mentioned range, or may be larger or smaller than the above-mentioned range. The refractive index as used in the present disclosure and this specification refers to a refractive index for light at a wavelength of 500 nm. The lens substrate can be molded using a known molding method such as casting polymerization. By molding a lens substrate through casting polymerization using a mold having a molding face provided with a plurality of concave portions, a lens substrate provided with the substrate protruding portions on at least one surface can be obtained, for example.

[Coating Film]

An aspect of a coating film to be provided on the surface of the lens substrate provided with the substrate protruding portions is a cured film formed by curing a curable composition (the coating film liquid described so far) containing a curable compound. Such a cured film is commonly called a hard coating film, and contributes to improving the durability of the eyeglass lens. A curable compound means a compound having a curable functional group, and a curable composition means a composition containing one or more curable compounds.

An aspect of the curable composition (coating film liquid) for forming a cured film may be a curable composition containing an organosilicon compound as the curable compound, or a curable composition containing metal oxide particles together with an organosilicon compound. An example of a curable composition that can form a cured film is a curable composition described in JP S63-10640A.

An aspect of the organosilicon compound may be an organosilicon compound represented by General Formula (I) below or a hydrolysate thereof.

$$(R^1)_a(R^3)_b Si(OR^2)_{4-(a+b)} \qquad (I)$$

In General Formula (I), $R^1$ represents an organic group having a glycidoxy group, an epoxy group, a vinyl group, a methacryloxy group, an acryloxy group, a mercapto group, an amino group, a phenyl group, or the like, $R^2$ represents an alkyl group having 1 to 4 carbon atoms, an acyl group having 1 to 4 carbon atoms, or an aryl group having 6 to 10 carbon atoms, $R^3$ represents an alkyl group having 1 to 6 carbon atoms or an aryl group having 6 to 10 carbon atoms, and a and b independently represent 0 or 1.

The alkyl group having 1 to 4 carbon atoms represented by $R^2$ is a linear or branched alkyl group, and specific examples thereof include a methyl group, an ethyl group, a propyl group, and a butyl group.

Examples of the acyl group having 1 to 4 carbon atoms represented by $R^2$ include an acetyl group, a propionyl group, an oleyl group, and a benzoyl group.

Examples of the aryl group having 6 to 10 carbon atoms represented by $R^2$ include a phenyl group, a xylyl group, and a tolyl group.

The alkyl group having 1 to 6 carbon atoms represented by $R^3$ is a linear or branched alkyl group, and specific examples thereof include a methyl group, an ethyl group, a propyl group, a butyl group, a pentyl group, and a hexyl group.

Examples of the aryl group having 6 to 10 carbon atoms represented by $R^3$ include a phenyl group, a xylyl group, and a tolyl group.

Specific examples of the compound represented by General Formula (I) above include compounds disclosed in paragraph [0073] of JP 2007-077327A. Since the organosilicon compound represented by General Formula (I) has a curable group, a hard coating film can be formed as the cured film by performing curing processing after the application of such an organosilicon compound.

The metal oxide particles can contribute to the adjustment of the refractive index of the cured film and the improvement of the hardness thereof. Specific examples of the metal oxide particles include tungsten oxide ($WO_3$) particles, zinc oxide (ZnO) particles, silicon oxide ($SiO_2$) particles, aluminum oxide ($Al_2O_3$) particles, titanium oxide ($TiO_2$) particles, zirconium oxide ($ZrO_2$) particles, tin oxide ($SnO_2$) particles, beryllium oxide (BeO) particles, and antimony oxide ($Sb_2O_5$) particles, and these particles can be used alone or in combination of two or more types. It is preferable that the metal oxide particles have a particle diameter within a range from 5 to 30 nm from the viewpoint of achieving both scratch resistance and optical properties in the cured film. The content of the metal oxide particles in the curable composition can be set as appropriate in consideration of the refractive index and the hardness of a cured film to be formed, and may be normally set to about 5 to 80 mass % of the solid content in the curable composition. It is preferable that the metal oxide particles are colloidal particles from the viewpoint of the dispersibility in the cured film.

[Dipping Method]

A coating liquid for forming a cured film (coating film) on the surface of the lens substrate provided with the substrate protruding portions is supplied by immersing the lens substrate in a coating film liquid (curable composition). This causes liquid to intentionally pool in the surrounding regions of the substrate convex portions so that the film thickness of the coating film (the above cured film) is varied over the surrounding regions of the substrate protruding portions.

A cured film can be formed using the following method. A coated film is formed, for example, by applying a curable composition prepared by mixing components and optional components such as an organic solvent, a surfactant (leveling agent), and a curing agent as needed, onto the surface of the lens substrate provided with the substrate protruding portions through immersion, or applying it onto the surface of the lens substrate via another film. Curing processing (e.g., heating and/or light irradiation) is performed on this coated film according to the type of curable compound. If curing processing is performed through volatilization, for example, a curing reaction of the curable compound in the coated film may be advanced by placing the lens substrate provided with the coated film made of the curable composition in an environment at an ambient temperature of 50° C. to 150° C. for about 30 minutes to 3 hours in a state where the lens substrate is inclined while the curable composition has fluidity. Note that a drying process may be performed together with this curing reaction.

The viscosity of the curable composition for forming a coating film on the surface of the lens substrate provided with the substrate protruding portions can be set as appropriate, and the curable composition preferably has a viscosity in a range from 1 to 50 mPa·s, more preferably a range from 1 to 40 mPa·s, and even more preferably a range from 1 to 20 mPa·s. The viscosity as used in the present disclosure and this specification refers to the viscosity at a liquid temperature of 25° C.

The temperature of the curable composition when the lens substrate is immersed is preferably in a range of 0° C. to 30° C.

The boiling point of a solvent that constitutes the curable composition when the lens substrate is immersed is preferably in a range of 30° C. to 200° C., and preferably in a range of 60° C. to 120° C. There is no limitation on the type of solvent, and methanol, toluene, or the like can be used, for example.

The concentration of the curable composition when the lens substrate is immersed is preferably in a range of 1 wt % to 50 wt %.

The immersion time when the lens substrate is immersed is preferably in a range of 1 second to 300 seconds.

The speed at which the curable composition is pulled up when the lens substrate is immersed is preferably in a range of 10 to 400 mm/min.

Also, an aspect of the coating film formed on the surface of the lens substrate provided with the substrate protruding portions is a coating film that is commonly called a primer film and contributes to improving adherence between layers. Examples of a coating film liquid capable of forming such a coating film include compositions (referred to as "dry solidifiable compositions" hereinafter) in which a resin component such as a polyurethane resin is dispersed in a solvent (water, an organic solvent, or a mixed solvent thereof). Solidification of such a composition is advanced by removing a solvent through drying. Drying can be performed through a drying process such as air drying or heat drying. Note that a curing reaction may also be performed together with this drying process.

Heat drying is preferable as the drying method used after pulling up the lens substrate. Also, the drying temperature used after pulling up the lens substrate is preferably 20° C. to 130° C. Furthermore, drying after pulling up the lens substrate is preferably performed for 0 to 90 minutes. A drying time of 0 minutes means that the flowing coating film liquid is dried, and the coating film liquid is solidified through volatilization of a solvent without performing a drying step, and a coating film is formed.

The film thickness of the coating film formed through the above steps may be in a range of 0.1 to 100 µm (preferably, 0.5 to 6.0 µm, and even more preferably 1.0 to 5.0 µm), for example. However, the film thickness of the coating film is determined according to the function required for the coating film, and is not limited to the above-mentioned range. Note that the above range of the film thickness may be applied to the film thickness of the coating film base portion.

One or more additional coating films can also be formed on the coating film. Examples of such coating films include various coating films such as an antireflection film, a water repellent or hydrophilic antifouling film, and an antifogging film. A known technique can also be applied to a method for forming these coating films.

[Method for Measuring Stray Light Ratio]

Stray light rays are rays that enter from the object-side surface of the eyeglass lens and are emitted from the eyeball-side surface, and refer to rays that do not pass through the vicinity of the predetermined position A at which rays are converged by the eyeglass lens, and also do not pass through the vicinity of the position B at which rays are converged by the substrate protruding portions and the coating film convex portions. Stray light rays cause blurring of the wearer's visual field. Thus, it is preferable to reduce the ratio of stray light rays (also referred to as "stray light ratio" hereinafter) relative to rays that enter from the object-side surface of the eyeglass lens and are emitted from the eyeball-side surface.

One of the reasons stray light rays occur is the coating film. If the shape extending from the convex surface, which is the object-side surface serving as the base, changes excessively smoothly at the base of the coating film convex portion, the resulting shape differs from the spherical shape of the substrate protruding portion, and also differs from the convex surface, which is the object-side surface. Accordingly, rays will not be focused on the retina of the wearer (the vicinity of the predetermined position A in this specification), and will not be focused in the vicinity of the position B that is closer to the object.

The "base (also referred to as a surrounding region) of a coating film convex portion" in this specification refers to the boundary between the base portion on the outermost surface of the eyeglass lens and the coating film convex portion. From the viewpoint of the surface shape of the eyeglass lens, compared to portions other than that at the boundary, the surface shape more significantly changes at the boundary from the center of the coating film convex portion to the coating film base portion. The curvature changes significantly and discontinuously in some cases, for example. A portion where the curvature changes significantly is referred to as the base (boundary) of the coating film convex portion. This definition is also applicable to the substrate protruding portions.

If the base is to be expressed another way, the portion where astigmatism begins to increase rapidly from the center of the coating film convex portion to the coating film base portion may be referred to as the base (boundary). Astigmatism (profile curve) in a cross-sectional view of the eyeglass lens can be measured using a method called coherence correlation interferometry.

Ray tracing calculation is used to set the stray light ratio. A situation in which a large number of rays evenly enter a predetermined range of the object-side surface of the eyeglass lens and pass through the coating film (i.e., a situation in which the eyeglass lens is worn and the wearer is looking at their surroundings) is presumed in this calculation. This "predetermined range" needs only be an optical region on the object-side surface. This "optical region" refers to a portion having a curved surface shape that realizes the power set according to the wearer on the object-side surface and the eyeball-side surface that is located opposite thereto.

Here, conditions under which the stray light ratio is determined will be described below.

Figure 2:
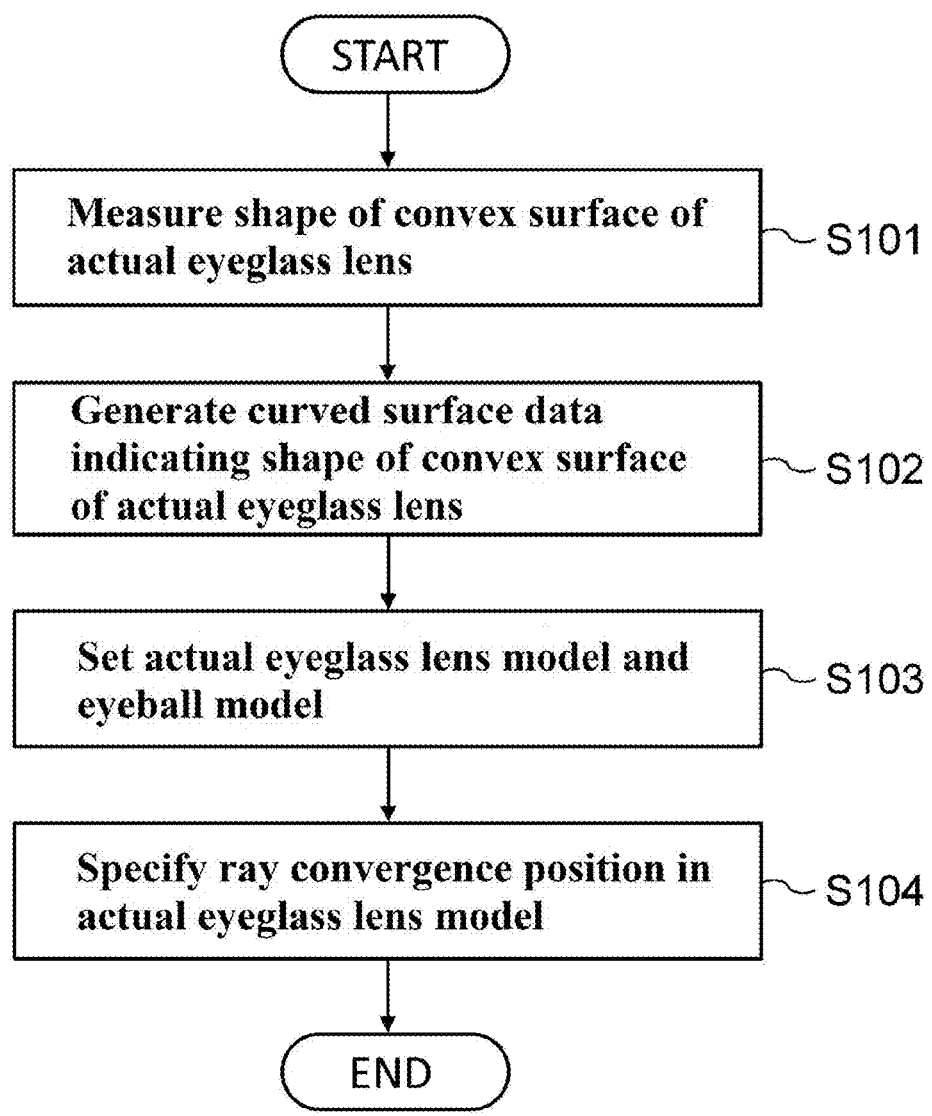
FIG. 2 is a flowchart showing the flow of a method for inspecting an eyeglass lens according to one aspect of the present disclosure.

FIG. 2 is a flowchart showing the flow of a method for inspecting an eyeglass lens according to one aspect of the present disclosure.

As shown in FIG. 2, first, in step S101, the shape of the object-side surface (also referred to as "convex surface" hereinafter) of the actual eyeglass lens is measured, and curved surface data representing the shape of the convex surface is generated (shape measurement step). The shape of the convex surface is measured using a noncontact three-dimensional microscope for measuring length, utilizing light interference, for example. The three-dimensional shape of the convex surface is acquired as discrete three-dimensional data (x, y, z), for example.

Then, in step S102, curved surface data is generated from the obtained data indicating the shape of the convex surface of the eyeglass lens (curved surface data generation step). Note that, if discrete three-dimensional data is used as data indicating the shape of the convex surface of the eyeglass lens, a set of B-spline curves need only be generated, for example. Also, if measured discrete three-dimensional data includes noise, moving average processing may be performed and an average value may be used, for example.

Then, in step S103, a model of the actual eyeglass lens is set based on the curved surface data (model setting step).

The model of the actual eyeglass lens is set, and an eyeball model is also set. Information relating to the wearer (e.g., the axial length and accommodation amount of the eye) may be used for an eyeball model. At this time, an eyeglass lens model may be disposed with respect to an eyeball model in consideration of the inclination of the eyeglass lens when attached to the frame thereof (a forward tilt angle and a frame tilt angle).

Then, in step S104, the position at which rays converge most when the rays have passed through the actual eyeglass lens is specified through a ray tracing process (convergence position specifying step). Specifically, the PSF (Point Spread Function) representing the luminance distribution of rays obtained after rays emitted from an indeterminately distant light source have passed through the model set based on the curved surface data of the actual eyeglass lens is obtained.

The PSF can be obtained by tracing a large number of rays emitted from the point light source and calculating the density of spots on any plane. Then, the position (plane) on which rays are most concentrated in any plane is specified by comparing the PSFs in the relevant planes. Note that the diameter of the flux of multiple rays need only be set based on a motion diameter, and may be set to 4φ, for example.

Figure 3:
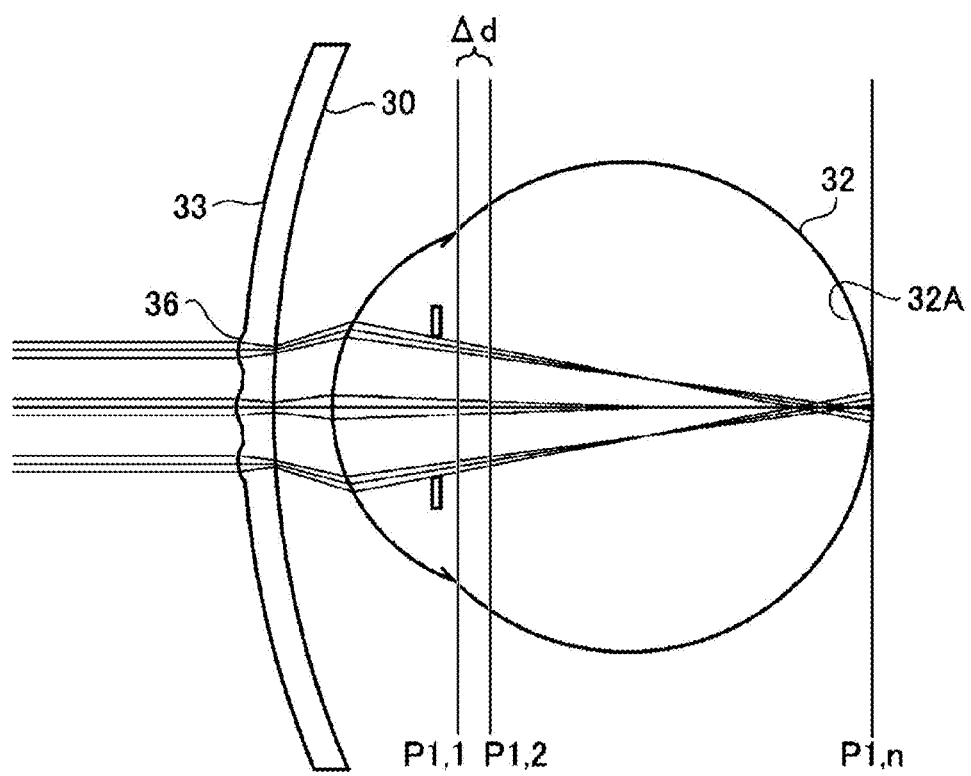
FIG. 3 is a diagram (No. 1) illustrating a method for specifying a position at which rays are concentrated.
Figure 4:
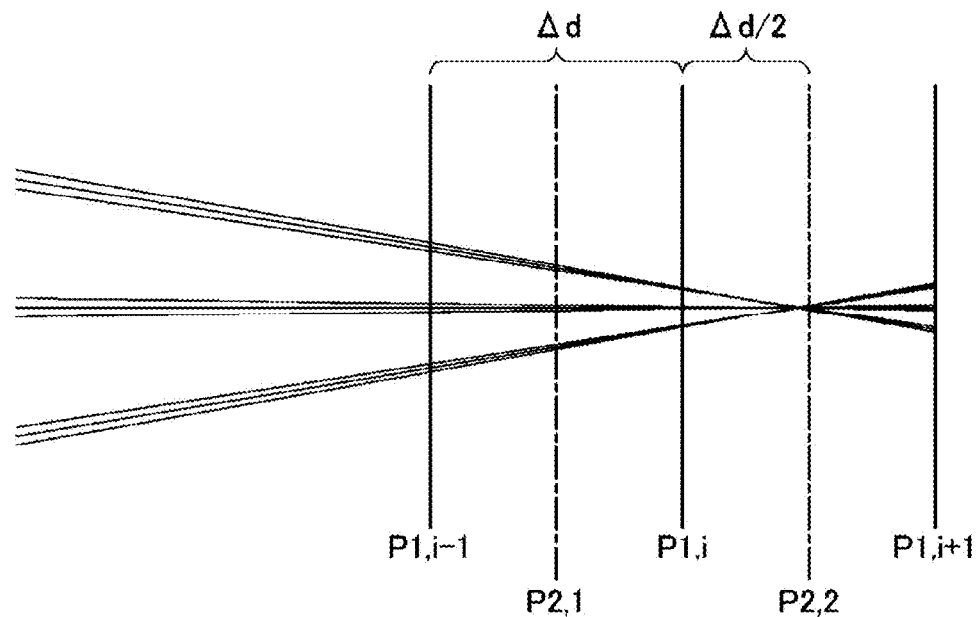
FIG. 4 is a diagram (No. 2) illustrating a method for specifying a position at which rays are concentrated.
Figure 5:
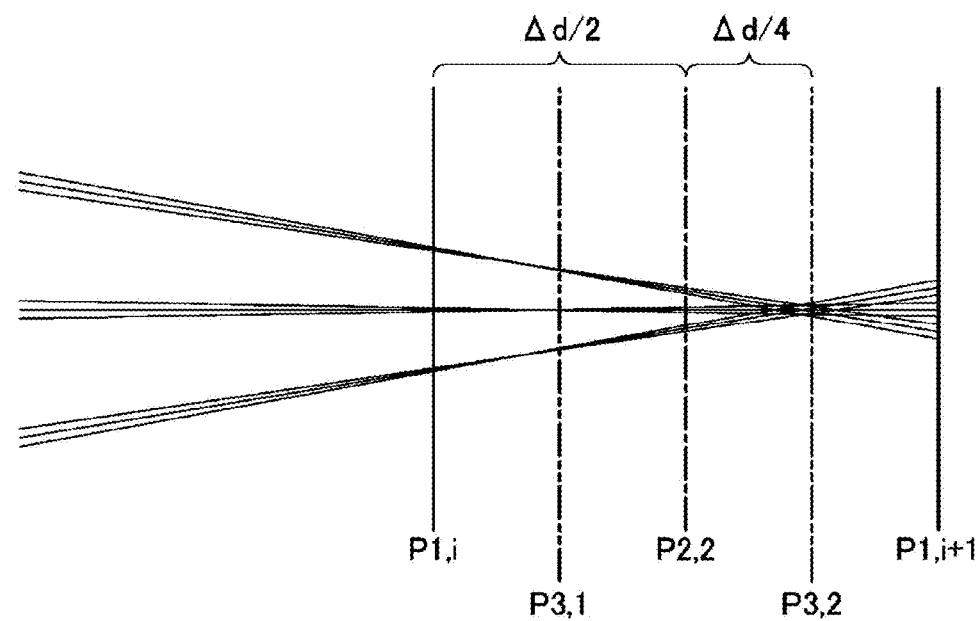
FIG. 5 is a diagram (No. 3) illustrating a method for specifying a position at which rays are concentrated.
Figure 6:
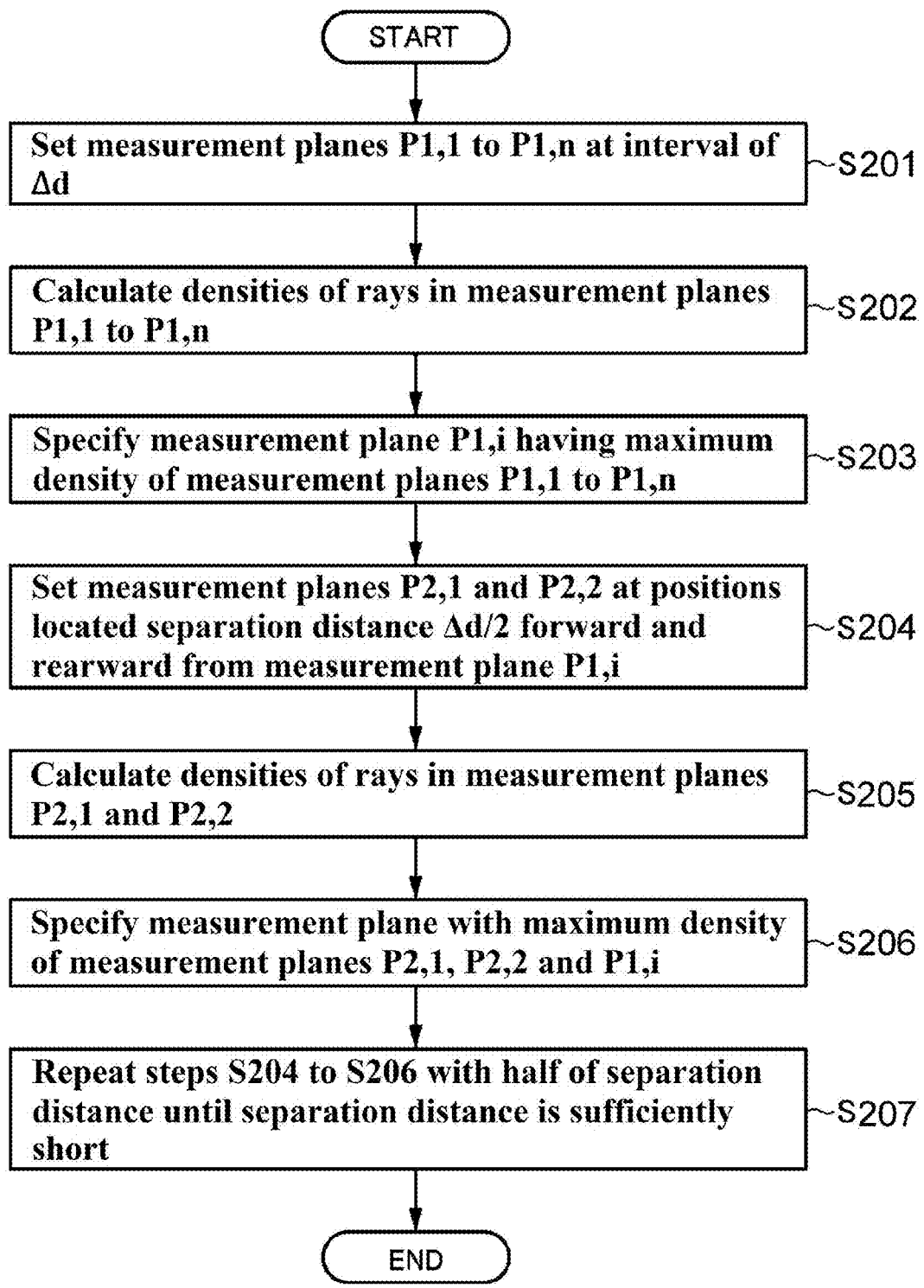
FIG. 6 is a flowchart illustrating a method for specifying a position at which rays are concentrated.

Here, a method for specifying, in step S104, the position at which rays are most concentrated will be described in more detail. FIGS. 3 to 5 are diagrams illustrating the method for specifying a position at which rays are concentrated. Also, FIG. 6 is a flowchart showing the method for specifying a position at which rays are concentrated. In FIG. 3, reference numeral 30 indicates the eyeball-side surface, reference numeral 33 indicates the object-side surface, reference numeral 36 indicates the substrate protruding portion (i.e., the coating film convex portion on the outermost surface of the eyeglass lens), reference numeral 32 indicates the eyeball model, and reference numeral 32A indicates the retina.

First, as shown in FIG. 3, in step S201, a situation is presumed in which rays pass through the coating film convex portion of the object-side surface (the convex surface) on a model. Then, measurement planes P1,1 to P1,n are set at increments of a predetermined separation interval Δd (e.g., 0.1 mm) from a predetermined distance (e.g., a position located at about 16 mm, which is the thickness of the vitreous body) from a position of 0 mm on the retina A of the eyeball model to the retina. Note that the separation interval Δd may be set to an interval of 0.2 mm or 1/50 of the axial length of the eye.

Then, a ray tracing process is performed, and the densities of rays in the measurement planes P1,1 to P1,n are calculated in step S202. The densities of rays need only be calculated by setting a lattice-shaped grid (e.g., 0.1 mm×0.1 mm) to each measurement plane and calculating the number of rays passing through the grids, for example.

Then, in step S203, in order to specify a measurement plane where rays that have entered the convex portion have the maximum density, of the measurement planes P1,1 to P1,n, the measurement plane P1,i where rays have the first maximal density from the predetermined distance is specified. In order to omit calculation, calculation of the ray density may be started from the measurement plane P1, and calculation of this step may be terminated when after the first maximal value is detected, the value obtained by calculating the ray density decreases to about an intermediate value between the value in the measurement plane P1 and the first maximal value.

Then, as shown in FIG. 4, in step S204, the measurement plane P2,1 and the measurement plane P2,2 are set at positions located a separation distance Δd/2 forward and rearward from the measurement plane P1,i with the maximum density. Then, the densities of rays in the measurement plane P2,1 and the measurement plane P2,2 are calculated in step S205. The measurement plane with the maximum density is specified from the measurement planes P2,1, P2,2, and P1,i in step S206.

Then, in step S207, the same steps as steps S204 to S206 are repeated until the separation distance becomes sufficiently short. That is, as shown in FIG. 5, a step of setting a new measurement plane (P3,1 and P3,2 in FIG. 5) at a position located a new separation distance (Δd/4 in FIG. 5), which is half of the previous separation distance, forward and rearward from the measurement plane (P2,2 in FIG. 5) that previously had the maximum density, a step of calculating the density of rays in the new measurement plane, and a step of specifying the measurement plane that previously had the maximum density and a measurement plane out of the new measurement planes that has the maximum are repeated.

It is possible to specify a position at which rays are concentrated in the direction in which an optical axis extends (the thickness direction of the lens, the Z-axis) through the above-described steps.

The position at which rays converge on a plane perpendicular to the direction in which an optical axis extends (i.e., on the specified measurement plane) is then specified. The above-described PSFs are used to specify this position. A portion (a point on the measurement plane) at which rays are most concentrated is specified using the PSFs, as a ray convergence position B on the measurement plane.

Also, the number of rays located outside a radius of 2.5 to 20 μm from the ray convergence position B on the measurement plane is calculated, for example. The inner side of a radius of 2.5 to 20 μm (a radium of 5.7 μm is adopted in this specification) from the convergence position B refers to the "vicinity of the position B" in this specification, for example.

Rays located inside a radius of 2.5 to 20 μm from the predetermined position A at which rays are converged by the eyeglass lens (i.e., normal rays that converge at the position A) are subtracted from the rays outside the above range. The inner side of a radius of 2.5 to 20 μm (a radius of 5.7 μm is adopted in this specification) from the convergence position A refers to the "vicinity of the position A" in this specification, for example.

The rays remaining after subtraction do not converge in the vicinity of the position A at which rays converge due to the eyeglass lens, and do not converge in the vicinity of the position B at which rays converge due to the coating film convex portion and that is closer to the object. Such rays are referred to as stray light in this specification.

<Eyeglass Lens>

An eyeglass lens obtained using a method according to one aspect of the present disclosure is as follows.

"An eyeglass lens that includes a lens substrate having a plurality of substrate protruding portions that protrude from a substrate base portion on a surface of the lens substrate and a coating film provided so as to cover the plurality of substrate protruding portions, the outermost surface of the eyeglass lens having a plurality of convex portions and concave portions, in which the thickness of the coating film varies over surrounding regions of the substrate protruding portions."

As described in the section regarding effects of the present disclosure, with the eyeglass lens obtained using a method according to one aspect of the present disclosure, the generation of stray light is suppressed.

The stray light ratio of the eyeglass lens according to one aspect of the present disclosure is 30% or less. Accordingly, even after a coating film is formed on the lens substrate, the effect of suppressing near-sightedness can be sufficiently exhibited.

Considering that one of the reasons for the generation of stray light rays is the coating film and that the coating film is essential for the eyeglass lens according to one aspect of the present disclosure, the stray light ratio may be set to more than 0% (or 0% or more, or 2% or more) and 20% or less. Furthermore, it is preferable to reduce the stray light ratio, and thus the stray light ratio is preferably set to 20% or less, more preferably set to 15% or less (more preferably less than 15%), and further preferably set to 10% or less (preferably less than 10%).

How many of the coating film convex portions on the eyeglass lens need to satisfy the above stray light ratio range will be described in detail in <Measurement of defocus power and stray light ratio> in the item of Examples, which will be described later.

With regard to the following specified values, more than 50% of all of the coating film convex portions (or more than 50% of all of the substrate protruding portions) preferably satisfy the following specified values. More favorably, 80% or more, 90% or more, 95% or more, or 99% or more of the coating film convex portions satisfy the specified values in a suitable order, and repeated description will be omitted.

Furthermore, it is preferable that, when each substrate protruding portion is viewed in a plan view, the coating film is thin in a region extending in a predetermined direction in the surrounding region of the substrate protruding portion, i.e., in the surrounding regions of all of the substrate protruding portions, and a region extending in the opposite direction to the predetermined direction, and a portion with a thick coating film is present in a region extending in other directions.

In this specification, an example is mainly described in which the lens substrate is immersed in and pulled up in the up-down direction as described before, and thus the coating film liquid flows in a direction from an upper portion to a lower portion of the lens substrate. Thus, in this example, the region that is described in the previous paragraph and extends in the predetermined direction where the coating film is thin refers to an upper portion of the substrate protruding portion (predetermined direction=zero-o'clock direction with a rotation angle of 0 degrees when viewed from geometric center of substrate protruding portion) and a lower portion of the substrate protruding portion (opposite direction to predetermined direction=six-o'clock direction with a rotation angle of 180 degrees when viewed from geometric center of substrate protruding portion).

Also, "other directions" in the previous paragraph refer to directions other than the upward direction and the downward direction (i.e., rotation angle exceeds 0 degrees and is less than 180 degrees and exceeds 180 degrees and is less than 360 degrees when viewed from the geometric center of the substrate protruding portion) in the above example. More specifically, a region of a surrounding region of each substrate protruding portion where the coating film is relatively thick is a region spreading clockwise from a predetermined direction to an angle of 15 to 145 degrees and 215 to 345 degrees (preferably 50 to 110 degrees and 250 to 310 degrees centered on 80 degrees and 280 degrees) when viewed from the geometric center of the substrate protruding portion.

The plot with a rotation angle of 0 to 360 degrees on the horizontal axis and the thickness of a coating film on the vertical axis with respect to the base of the coating film convex portion is focused on. On this plot, the angle at which the thickness of the coating film is at the smallest value (and favorably also at the minimal value) is preferably set to a rotation angle of 0 degrees.

In this case, it is preferable that the film thickness that is larger than the smallest value and is at the minimal value is the film thickness at the base at a rotation angle of 165 to 195 degrees. It is preferable that more than 50%, 80% or more, 90% or more, 95% or more, and 99% or more of all of the coating film convex portions satisfy these specified values (this description will be omitted hereinafter).

It is preferable that the film thickness that is at the largest value and the maximal value is the film thickness at the base at a rotation angle of 50 to 110 (preferably 60 to 100) degrees or 250 to 310 (preferably 260 to 300) degrees. Also, the film thickness that is smaller than the largest value and is at the maximal value is preferably present in a range of rotation angles where the largest value is not present.

That is, it is preferable that at least two maximal values are present on the plot, and the rotation angles indicating these two maximal values respectively belong to the above two ranges.

It is preferable that the ratio between the largest value and the smallest value of the thickness of the coating film extending over the surrounding regions of the substrate protruding portions is large. The fact that a finished eyeglass lens includes convex portions and concave portions (in particular, the effect of suppressing the progression of near-sightedness is exhibited) means that, even when a coating film is thick over a surrounding region of a substrate protruding portion, the thickness of the coating film is not thick enough to completely hide the shape of the substrate protruding portion.

That is, the largest value of the thickness of the coating film extending over the surrounding regions of the substrate protruding portions is a reasonable value (a value obtained when a coating film is provided on substrate protruding portions using a conventional spin coating method) as long as the eyeglass lens can exhibit the effect of suppressing the progression of near-sightedness.

In that case, if the smallest value of the thickness of the coating film extending over the surrounding regions of the substrate protruding portions can be set to a small value, the shape of the outermost surface of the eyeglass lens approximates the shape of the substrate protruding portions. This means that the stray light ratio of a portion where the thickness of the coating film is smallest decreases.

Thus, the stray light ratio relating to a portion of the outermost surface of the eyeglass lens that corresponds to one substrate protruding portion is lower than in a case where a conventional spin coating method is adopted.

Figure 12:
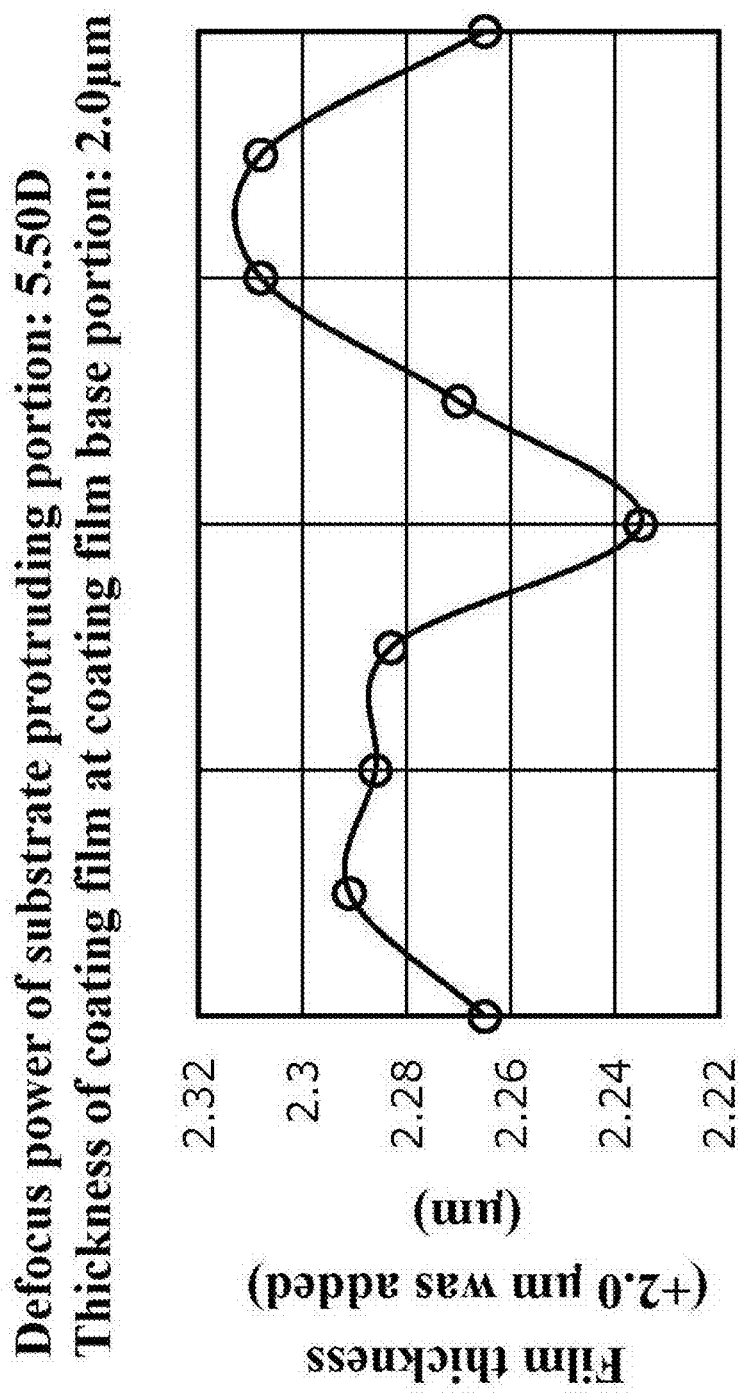
FIG. 12 is a diagram showing a plot of the thickness of a coating film (vertical axis) for every rotation angle (horizontal axis) in a plan view of a cross-section of a lens at the base of a coating film convex portion in Example 5.

As shown in FIG. 12 (Example 5) and FIG. 15 (Example 7) below, the value obtained by dividing the smallest value of the thickness of the coating film (at a rotation angle of 0 to 360 degrees) that extends over the surrounding region of the substrate protruding portion by the largest value thereof (smallest value/largest value) is preferably in a range of 0.10 to 0.99. The lower limit may be 0.20, 0.30, 0.40, 0.50, 0.60, 0.70, 0.80, 0.90, or 0.92. The upper limit may either be 0.98 or 0.97.

In FIG. 12 (Example 5), the above value (smallest value/largest value) is (2.065/2.123) 0.97.

In FIGS. 16A-16B (Example 7), the above value (smallest value/largest value) is (2.234/2.312) 0.97.

Figure 13:
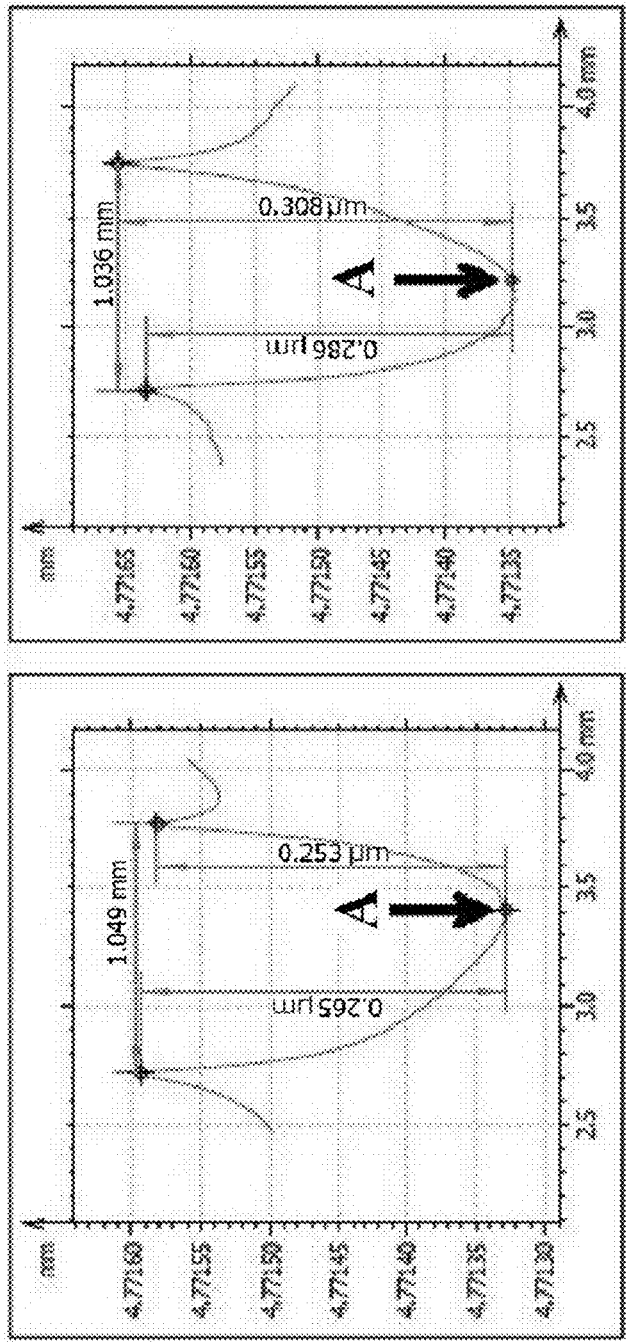
FIG. 13A is a diagram showing a plot of the thickness of a coating film on a cross-section of the lens in a left-right (horizontal) direction in Example 5.
FIG. 13B is a diagram showing a plot of the thickness of a coating film on a cross-section of the lens in the up-down direction in Example 5.

As shown in FIGS. 13A-13B (Example 5) and FIGS. 16A-16B (Example 7) below, on a cross-section of the lens that includes the centers of the coating film convex portions, (the smallest value of difference values expressed by (the largest value of the thickness of the coating film−the thickness of the coating film at vertexes of coating film convex portions))/(the largest value of difference values expressed by (the largest value of the thickness of the coating film−the thickness of the coating film at vertexes of coating film convex portions)) (Equation 1 hereinafter) is preferably 0.90 (or 0.85, 0.80, 0.75, or 0.60) or less. There is no limitation on the lower limit, and examples thereof include 0.10, 0.20, 0.30, 0.40, or 0.50. Equation 1 above is one of the indexes for indicating the degree at which the film thickness at the base of the substrate protruding portion varies over the surrounding region of the base.

In FIGS. 13A-13B (Example 5), it is possible to adopt a value in FIG. 13A, i.e., on a left-right cross-section (horizontal, three-o'clock direction-nine-o'clock direction, the same applies to the following) as (the largest value of difference values expressed by (the largest value of the thickness of the coating film−the thickness of the coating film at vertexes of coating film convex portions)). At this time, this value is 0.308 μm.

In FIGS. 13A-13B (Example 5), it is possible to adopt a value in FIG. 13B, i.e., on a vertical cross-section (zero-o'clock direction-six-o'clock direction, the same applies to the following) as (the smallest value of difference values expressed by (the largest value of the thickness of the coating film–the thickness of the coating film at vertexes of coating film convex portions)). At this time, this value is 0.253 µm.

As a result, the value of Equation 1 is 0.82 in Example 5.

In FIGS. 16A-16B (Example 7), it is possible to adopt a value in FIG. 16A, i.e., on a left-right cross-section (horizontal, three-o'clock direction-nine-o'clock direction, the same applies to the following) as (the largest value of difference values expressed by (the largest value of the thickness of the coating film–the thickness of the coating film at vertexes of coating film convex portions)). At this time, this value is 0.123 µm.

In FIGS. 16A-16B (Example 7), it is possible to adopt a value in FIG. 13B, i.e., on a vertical cross-section (zero-o'clock direction-six-o'clock direction, the same applies to the following) as (the smallest value of difference values expressed by (the largest value of the thickness of the coating film–the thickness of the coating film at vertexes of coating film convex portions)). At this time, this value is 0.065 µm.

As a result, the value of Equation 1 is 0.53 in Example 7.

In FIGS. 13A-13B and 16A-16B, a portion where the thickness of the coating film is at the largest value and the maximal value coincides with the position directly above the base (boundary) of the substrate protruding portion in the Z-direction. In FIGS. 13A-13B and 16A-16B, a portion that has the thickness of the coating film at the vertex of the coating film convex portion coincides with the position of the vicinity directly above the vertex of the base member convex portion.

That is, based on FIG. 12 (Example 5) and FIG. 15 (Example 7) below that show the relationship between the rotation angle centered on the substrate protruding portion and the film thickness at the base, it is also clear that the film thickness is largest at the base of the substrate protruding portion on a left-right cross-section, and the film thickness is smallest at the base of the substrate protruding portion on a vertical cross-section.

At that time, the smallest value of the thickness of the film provided at the base of the substrate protruding portion is preferably 0.01 to 2.00 times the film thickness of the coating film base portion. The lower limit may be 0.10, 0.20, 0.30, 0.40, 0.50, 0.60, 0.70, 0.80, 0.90, or 1.05. The upper limit may be 1.90, 1.80, 1.70, 1.60, 1.50, 1.40, 1.30, or 1.20.

Similarly to the substrate protruding portions, the height of the coating film convex portion may be in a range of 0.1 to 10 µm, for example, and is preferably in a range of 0.5 to 2 µm. Similarly to the substrate protruding portions, the defocus power of the coating film convex portion may also be a refractive power of 2.50 D to 6.50 D of the substrate protruding portion. The upper limit of the defocus power may be 5.50 D or 5.00 D, and the lower limit may be 3.00 D.

The "defocus power" in this specification refers to the difference between the refractive power of each defocus region and the refractive power of a portion other than the defocus region. In other words, "defocus power" refers to the difference obtained by subtracting the refractive power of a base portion from the average of the minimum refractive power and the maximum refractive power at a predetermined portion in the defocus region. A case where the defocus region is a convex portion region is described in this specification.

"Refractive power" in this specification refers to an average refractive power, which is the average of a refractive power in a direction a in which the refractive power is smallest and a refractive power in a direction b (the direction that is perpendicular to the direction a) in which the refractive power is largest.

According to one aspect of the present disclosure described above, the thickness of the coating film is varied using a dipping method. On the other hand, the inventors of the present disclosure found that, even when a spin coating method is adopted, the thickness of the coating film can be varied. Specifically, the thickness of the coating film can be varied by inclining the lens substrate before completing the spin coating method, and causing the coating film liquid to flow in one direction. More specifically, when the spin coating method was adopted and conditions that are the same as in Example 1 below were used, except for the content described below, the thickness of the coating film can be varied by performing spin coating at 500 rpm for only 3 seconds, then performing spin coating at 1000 rpm for only 3 seconds, inclining the lens substrate in the vertical direction immediately thereafter and leaving the lens substrate for 1 minute, and performing a drying process on the coating film liquid. The conditions for spin coating other than the above are as follows.

Drying method after spin coating: Heating

Drying temperature after spin coating: 110° C.

Drying time after spin coating: 90 minutes

In any case, the technical ideas of the present disclosure are to vary the thickness of the coating film while maintaining the state where the outermost surface has a plurality of convex portions and concave portions. Breaking from the spin coating method was a certain trigger for the technical ideas of the present disclosure. However, this is just a trigger, and it is possible to manufacture an eyeglass lens according to the technical ideas of the present disclosure even using the spin coating method as described in the above paragraph. This is also a finding that could only be found by the inventors of the present disclosure. As a result, the present disclosure is not limited to a coating film formation method.

Note that "convergence" in this specification refers to converging in at least one of the vertical direction and the horizontal direction. Also, the number of convergence positions need not be one, and the convergence positions may vary in the direction in which an optical axis extends depending on a portion in one coating film protruding portion.

EXAMPLES

Next, examples will be described, and the present disclosure will be described in detail. Needless to say, the present disclosure is not limited to the following examples.

Example 1

The following lens substrate was produced. Note that no other substance was laminated on the lens substrate. The prescription power was set to 0.00 D for S (spherical power) and 0.00 D for C (cylinder power).

Diameter of lens substrate in plan view: 100 mm
Type of lens substrate: PC (polycarbonate)
Refractive index of lens substrate: 1.589
Base curve of lens substrate: 3.00 D
Surface provided with substrate protruding portions: Object-side surface
Shape of substrate protruding portion in plan view: Perfect circle (diameter 1 mm)
Height of substrate protruding portion from substrate base portion: 0.8 µm (hemisphere and sphere)
Arrangement of substrate protruding portions in plan view: Discrete arrangement in which centers of substrate protruding portions independently serve as vertexes of equilateral triangle (the center of each substrate protruding portion is located at the vertex of a honeycomb structure)
Range in which substrate protruding portions are provided: within circle with a radius of 17 mm from lens center
Pitch between substrate protruding portions (the distance between the centers of substrate protruding portions): 1.5 mm A coating film was formed on both surfaces (the entirety of upper and lower surfaces) of this lens substrate using a dipping method. The immersion direction and pulling-up direction were set to the vertical direction. Various conditions for the coating film liquid and the dipping method were as follows.

Type of coating film liquid: Thermosetting coating agent
Temperature of coating film liquid: 10° C.
Viscosity of coating film liquid: 10 mPa·s
Boiling point of solvent (methanol) for coating film liquid: 64.7° C.
Immersion time: 3 minutes
Pulling-up speed: 60 mm/min
Drying method after pulling-up: Heating
Drying temperature after pulling-up: 110° C.
Drying time after pulling-up: 90 minutes <Checking of Degree of Variation in Thickness of Coating Film>

As for Example 1, the degree of variation in the thickness of the coating film was checked. Specifically, the thickness of the coating film was obtained using a device called Talysurf (registered trademark) CCI MP HS (manufactured by AMETEK Inc.).

Figure 7:
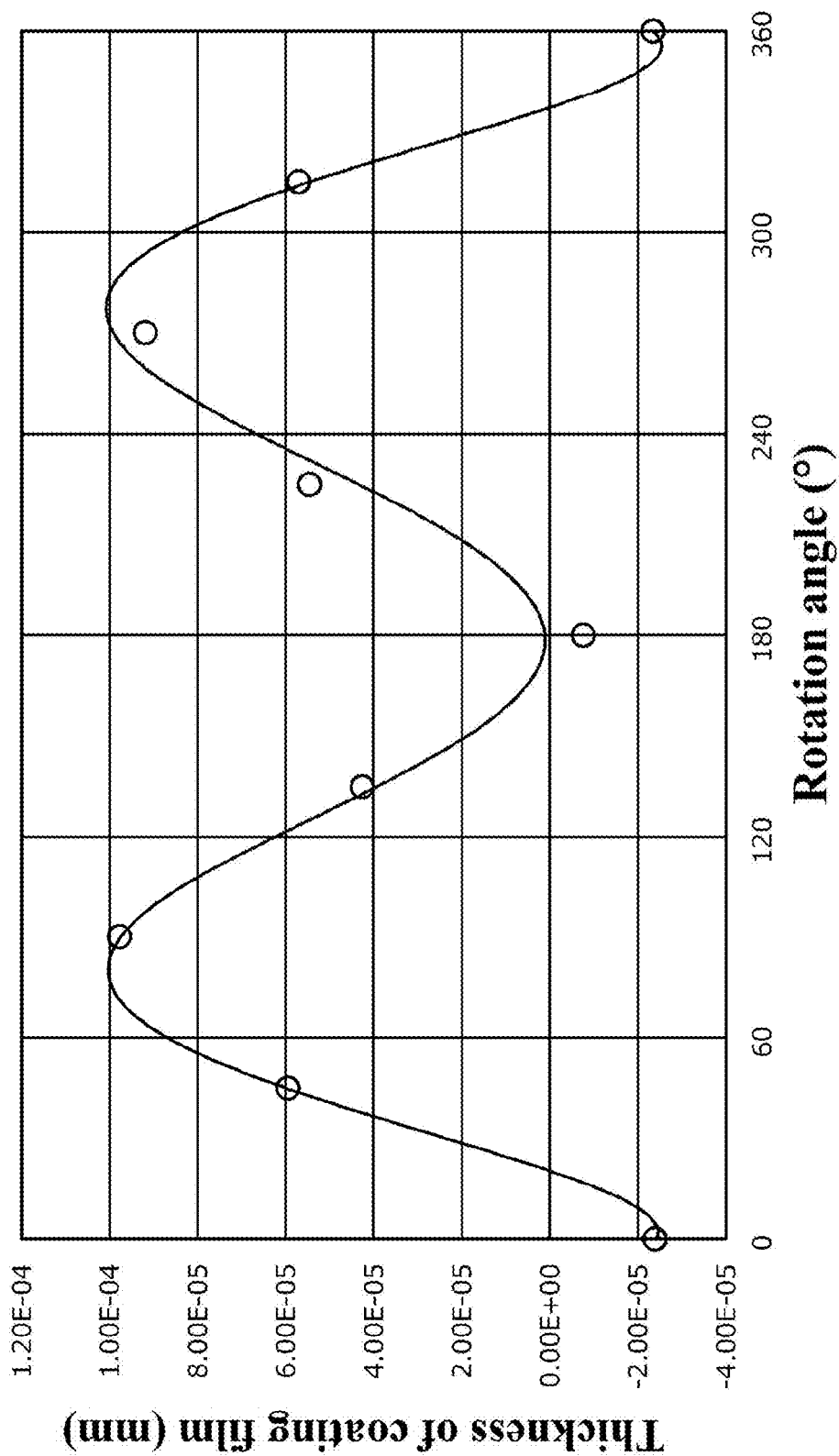
FIG. 7 is a diagram showing a plot of the thickness of a coating film provided on a surrounding region (base) of any one substrate protruding portion (0 to 360 degrees) on an eyeglass lens in Example 1, showing the thickness of the coating film on the vertical axis and the rotation angle from the zero-o'clock on the horizontal axis.

FIG. 7 is a diagram showing a plot of the thickness of the coating film provided on a surrounding region (base) of any one substrate protruding portion (0 to 360 degrees) on an eyeglass lens in Example 1, showing the thickness of the coating film on the vertical axis and the rotation angle from the zero-o'clock on the horizontal axis.

In FIG. 7, a partial shape of a sphere (virtual partially spherical shape) that is optimally approximated to the shape of the protruding portion (coating film protruding portion) on the outermost surface of the eyeglass lens obtained after the coating film was formed is presumed, and the difference in height in the Z-axial direction from this virtual partially spherical shape is set as a value on the vertical axis. Because the obtained difference is not the difference from the actual substrate protruding portion, a relatively thin portion gives a negative value in FIG. 7.

Figure 8:
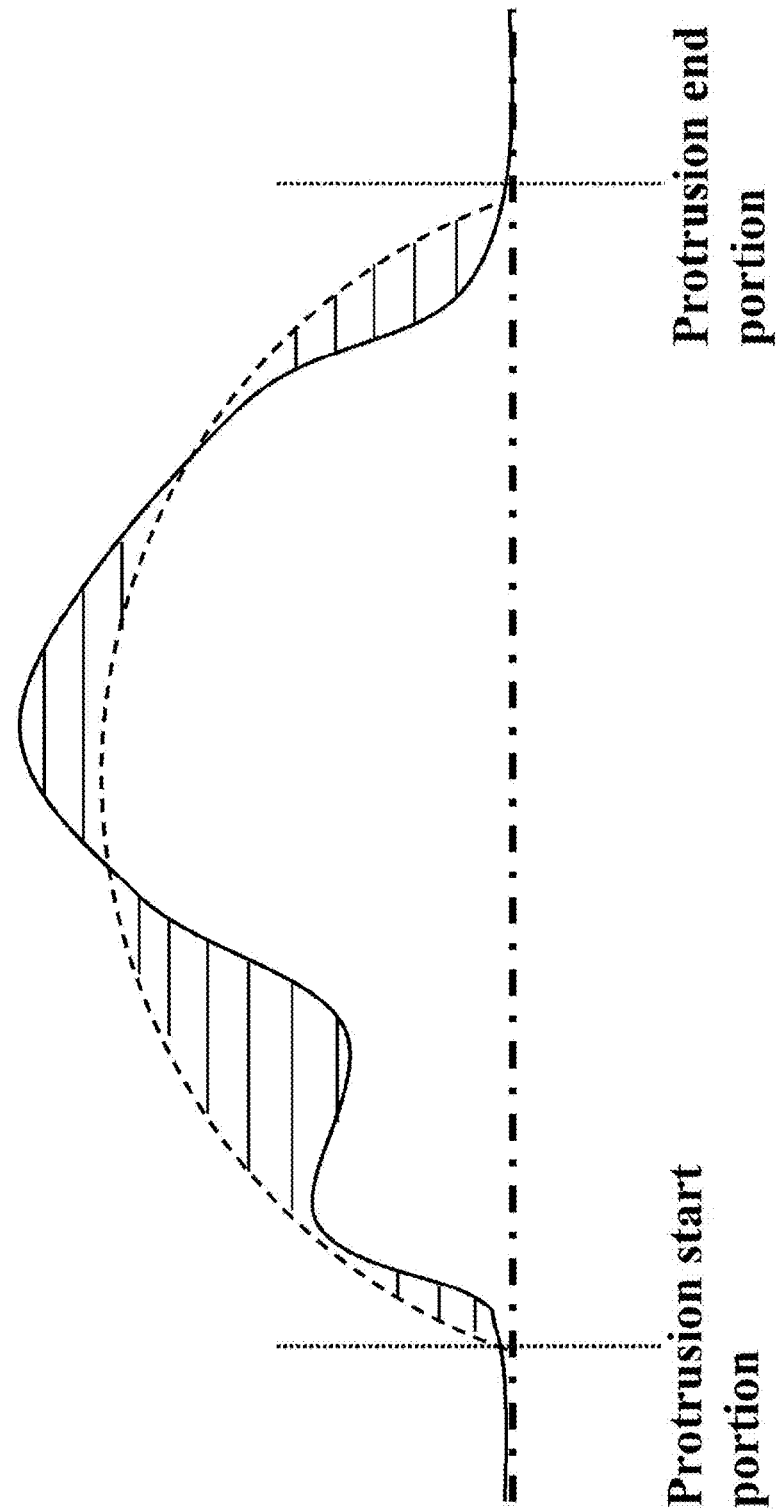
FIG. 8 is a schematic cross-sectional view illustrating an example of a coating film protruding portion (i.e., coating film convex portion) of an actual eyeglass lens and a virtual partially spherical shape. The solid line indicates the coating film protruding portion of the actual eyeglass lens, the broken line indicates the virtual partially spherical shape, a dash-dot line indicates a coating film base portion of the actual eyeglass lens, and a horizontally hatched portion indicates the difference between the virtual partially spherical shape and the shape of an actual coating film protruding portion in the thickness direction of the lens.

FIG. 8 is a schematic cross-sectional view illustrating an example of a coating film protruding portion (i.e., coating film convex portion) of an actual eyeglass lens and a virtual partially spherical shape. The solid line indicates the coating film protruding portion of the actual eyeglass lens, the broken line indicates the virtual partially spherical shape, a dash-dot line indicates a coating film base portion of the actual eyeglass lens, and a horizontally hatched portion indicates the difference between the virtual partially spherical shape and the shape of an actual coating film protruding portion in the thickness direction of the lens.

As shown in FIG. 8, a negative value on the vertical axis of the plot shown in FIG. 7 indicates that the height is lower than that of the virtual partially spherical shape. Also, the larger the negative value on the vertical axis is, the more significantly thinner the coating film is in a peripheral portion that corresponds to the negative value on the vertical axis.

Note that the virtual partially spherical shape is a partial shape of the sphere that is optimally approximated to the shape of the coating film protruding portion of the actual eyeglass lens. This virtual partially spherical shape can be obtained using the method of least squares, for example.

One specific example of optimal approximation is as follows. A spherical shape is disposed to overlap the shape of the coating film protruding portion. The difference in the lens thickness direction (an optical axis method, the Z-axis) between the two shapes of portions whose protrusions start from the base portion on the outermost surface of the eyeglass lens and end at the base portion through the vertex is squared. A virtual partially spherical shape that minimizes the sum of these values is set.

As a method other than the method of least squares, the virtual partially spherical shape may be obtained from the vertex of the coating film protruding portion and the positions of a plurality of points in the vicinity thereof. In this case, the difference may be examined by matching the vertex of the virtual partially spherical shape with the vertex of the coating film protruding portion of the actual eyeglass lens.

A point where a curve, which is obtained by curving the shape of the coating film protruding portion and differentiating the obtained curve once, has increased may be used as the protrusion start portion protruding from the base portion on the outermost surface. Also, a peak rising portion that rises from the astigmatism profile curve on a cross-section passing through the center of the coating film protruding portion in a plan view, may be used as the protrusion start portion. The protrusion end portion may be set in the same manner.

If a spin coating method is adopted, the coating film in the surrounding region of the substrate protruding portion has a uniform thickness. On the other hand, with Example 1 in which the dipping method was adopted, the thickness of the coating film in the surrounding region of the substrate protruding portion varied.

<Measurement of Defocus Power and Stray Light Ratio>

Defocus power was measured for Example 1. The defocus power (unit: D) is a value indicating how far the luminous flux is concentrated from the retina, and can be measured using ray tracing and part of the above-described method for measuring a stray light ratio.

Also, the stray light ratio was measured using the above-described method for Example 1. The stray light ratio is expressed as 100×(the number of stray light rays)/(the number of incident rays).

Note that the results of measurement of the defocus power and the stray light ratio were obtained as follows. Any circular region that includes the entirety of seven coating film convex portions in a range in which the substrate protruding portions were formed (within a circle with a radius of 17 mm from the lens center) was presumed (FIG. 10A), and the values in the circular region were adopted as the results of measurements. An eyeglass model and an eyeball model were set using the above method, and multiple light rays were caused to enter the circular region and the position at which the rays were concentrated was specified using the ray tracing method.

The eyeball model and various other conditions were as follows.

Axial length of eye: 24 mm
Accommodation amount of eye: 0.0 D
Distance between cornea and vertex of lens (CVD): 12.0 mm
Distance from vertex of cornea to rotation center of eyeball: 13.0 mm Hereinafter, the above conditions were adopted unless otherwise stated. However, the present disclosure is not limited to the above conditions.

In the example, a given circular region that is shown in FIG. 10A and includes the entirety of seven coating film convex portions was presumed, for example. On the other hand, a circular region that includes the entirety of three coating film convex portions that are arranged in a row such as that shown in FIG. 10B may also be used. This circular region may be a circular region that includes the entirety of another coating film convex portion located at the shortest distance from one coating film convex portion centered on the one coating film convex portion (i.e., a substrate protruding portion), for example. In this specification, this circular region is also referred to as the "smallest unit". Six other coating film convex portions described above are provided in FIG. 10A, and two other coating film convex portions are provided in FIG. 10B.

Note that this circular region may coincide with the diameter of a lens-meter (PSF analysis range). Usually, the diameter of the lens meter is 4.0 mm. If the pitch between coating film convex portions (substrate protruding portions) is substantially the same as the diameter (e.g., 4.0 mm) of the lens-meter, one coating film convex portion may be provided in the circular region and used as the smallest unit.

The "stray light ratio" in this specification is a result obtained through measurement with respect to the above smallest unit. That is, the "stray light ratio" in this specification is a result obtained by setting, as the smallest unit, a circular region (with a diameter of 4.0 mm, for example) that includes the entirety of another coating film convex portion located at the shortest distance from one coating film convex portion centered on the one coating film convex portion (i.e., a substrate protruding portion), and performing measurement on the smallest unit.

The eyeglass lens according to this specification includes a plurality of the smallest units. If the stray light ratio in at least one of the smallest units of the eyeglass lens satisfies the above numerical range, effects of the present disclosure are exhibited. It is preferable that more than 50%, 80% or more, 90% or more, or 95% or more of the plurality of the smallest units satisfy the specified values of the stray light ratio in a suitable order.

Here, first, an eyeglass model in which a plurality of design shapes were used was set, and the position at which light was concentrated was examined using the method described in "Description of Embodiments". As for the convex surface of a design eyeglass model (lens substrate), the substrate base portion was a sphere, and a substrate protruding portion was constituted by a sphere having a radius of curvature that was smaller than the radius of curvature of the substrate base portion. A plurality of design shapes were set by discretely changing the radius of curvature of the substrate protruding portion with respect to the sphere of the substrate base portion having a constant curvature. Also, a value obtained by subtracting the surface refractive power [D] according to the radius of curvature of the substrate base portion from the surface refractive power [D] according to the radius of curvature of the substrate protruding portion was used as the defocus value. A correlation equation between this defocus value and a defocus power calculated from the reciprocal of the actual position at which light was concentrated was obtained using the ray tracing method used for the eyeglass model in which a plurality of design shapes were used.

Figure 9:
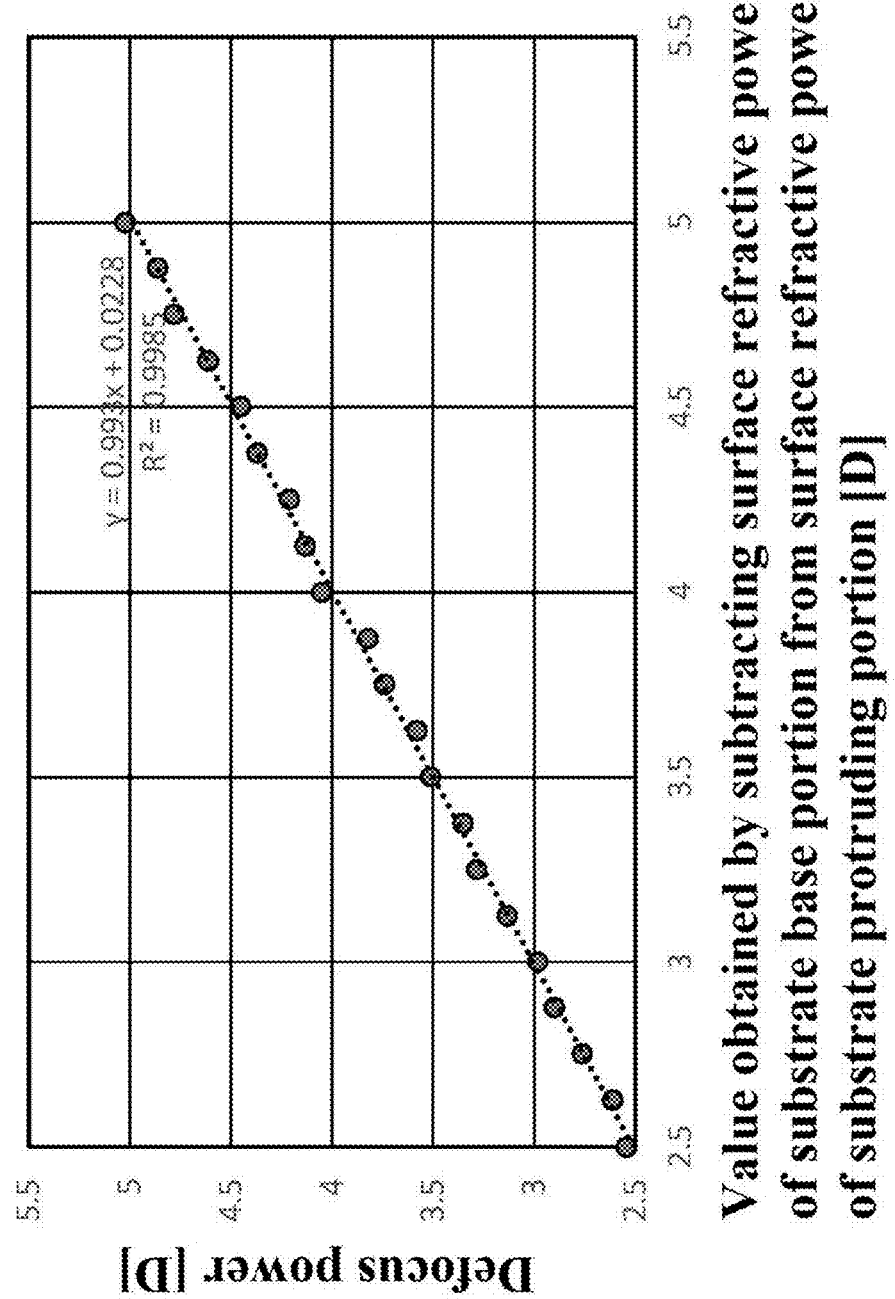
FIG. 9 is a diagram showing a plot of a correlation equation between a value (a defocus value) (horizontal axis) obtained by subtracting the surface refractive power of the substrate base portion from the surface refractive power of the substrate protruding portion and a defocus power (vertical axis) calculated based on the reciprocal of the position at which light is concentrated.

FIG. 9 is a diagram showing a plot of the correlation equation between the value (defocus value) (horizontal axis) obtained by subtracting surface refractive power of the substrate base portion from the surface refractive power of the substrate protruding portion and the defocus power (vertical axis) calculated from the reciprocal of the position at which light was concentrated.

In Example 1, the defocus power was measured by obtaining a value that corresponds to a defocus power in the eyeglass lens produced in Example 1, using this correlation equation.

The stray light ratio was also calculated from the PSF of the position at which light was concentrated and that was obtained using the method described in one aspect of the present disclosure.

In Example 1, it is presumed that there were seven regions where rays were concentrated on a plane that is perpendicular to the direction in which an optical axis extends at the light concentration position (the direction in which an optical axis extends) obtained at the time the defocus power was measured. This is to virtualize any circular region that includes the entirety of seven coating film convex portions (FIG. 10A). When a lattice-shaped grid is set to each measurement plane, the number of rays passing through the grids is calculated, and the grid with a certain number or more of rays passing therethrough is examined, it is conceivable that rays are concentrated and distributed in the seven regions.

In Example 1, the positions of the centers of gravity in the corresponding regions were obtained as a plurality of convergence positions B, and a value obtained by subtracting rays near the position A from rays outside the vicinity of the positions B was used as the number of stray light rays. The stray light ratio was calculated from the number of stray light rays, using the method described in [Description of Embodiments].

In Example 1, the defocus power was 3.73 D, and the stray light ratio was 7.7%. The eyeglass lens in Example 1 had a low stray light ratio, and sufficiently secured the defocus power.

Example 2

An antireflection film was formed on the lens substrate provided with the coating film produced in Example 1. Details of conditions under which the antireflection film was manufactured are described in Example 3 in JP 2013-97159A.

In Example 2, the defocus power was 3.73 D, and the stray light ratio was 7.7%. The eyeglass lens in Example 2 had the same performance as the defocus power and the stray light ratio of the eyeglass lens in Example 1. That is, it was confirmed that effects of the present disclosure were not impaired by the formation of the antireflection film.

Example 3

A second coating film liquid was prepared by reducing the amount of metal sol from the coating film liquid used in Example 1 and adding methanol. The lens substrate produced in Example 1 was immersed in the second coating film liquid. Everything else was the same as in Example 1.

In Example 3, the defocus power was 3.70 D, and the stray light ratio was 8.1%.

In Example 3 as well, the defocus power was also further improved and the stray light ratio was also further reduced, compared to a case where the coating film was formed on the minute convex portions described in Patent Document 1 using the conventional spin coating method. It is inferred that this is because convex portions and concave portions were present on the outermost surface of the eyeglass lens and the thickness of the coating film varied in the surrounding regions of the substrate protruding portions, even when properties of the coating film liquid were changed or the thickness of the coating film was changed.

Example 4

An eyeglass lens was produced using the same method as in Example 1, except for the following changed points.

The range in which the substrate protruding portions were formed was changed from the lens center to inside a circle with a radius of 17 mm (however, excluding a regular hexagonal region whose inscribed circle was a circle with a radius of 3.8 mm from the lens center)

Figure 11:
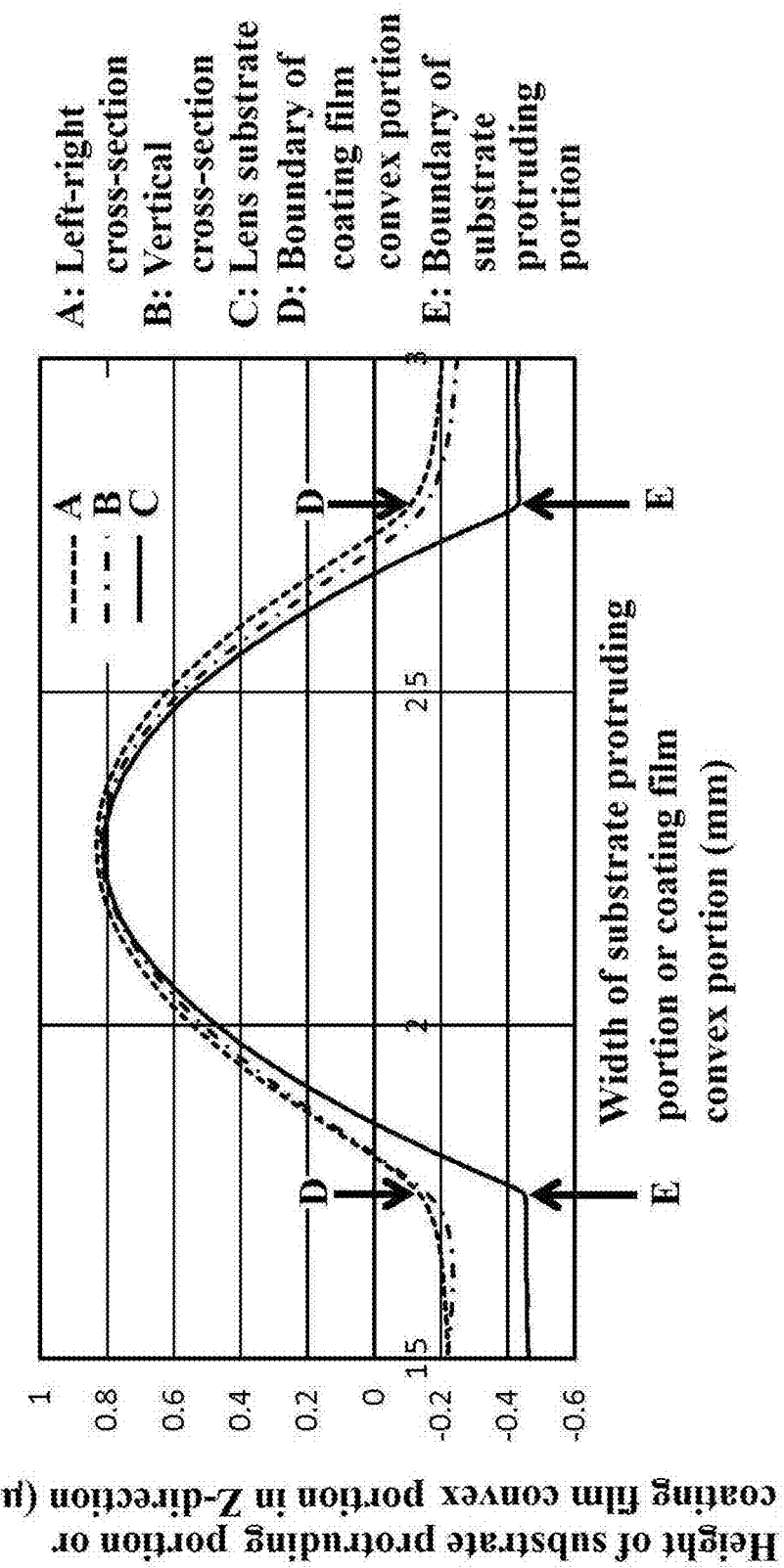
FIG. 11 is a diagram showing plots of the height of a coating film convex portion on a vertical cross-section of the coating film convex portion that is located horizontally leftward to the lens center and is the eighth closest from the lens center, and the height of the coating film convex portion on a left-right (horizontal) cross-section in Example 4.

The height of the substrate protruding portions was changed such that the refractive power at the center of the substrate protruding portions was 5.50 D Various conditions for the coating film liquid were changed such that the thickness of the coating film at the coating film base portion was 3.0 μm FIG. 11 is a diagram showing plots of the height of a coating film convex portion on a vertical cross-section of the coating film convex portion that is located horizontally leftward to the lens center and is the eighth closest from the lens center, and the height of the coating film convex portion on a left-right (horizontal) cross-section in Example 4.

On the plot similar to that in FIG. 11, the positions of the vertexes of the substrate protruding portion and the coating film convex portion were matched for convenience in order to facilitate understanding of the difference in shape therebetween. The actual film thickness is a film thickness obtained by adding the film thickness at the coating film base portion to the plot of the coating film convex portion. On the plot similar to that in FIG. 12 below, for example, the value obtained after addition is shown on the vertical axis.

The film thickness (in the thickness direction of the lens and the direction in which an optical axis extends) at a portion not provided with a substrate protruding portion may be specified as the film thickness at the coating film base portion. If the substrate protruding portions are provided on the entirety of one surface of the lens, the film thickness at a portion where the longest distance can be secured for each coating film convex portion may be specified as the film thickness at the coating film base portion. If a honeycomb structure is adopted as an example, the film thickness at the center of gravity between vertexes of a triangle (vertexes of three coating film convex portions that are adjacent to each other) may be specified as the film thickness at the coating film base portion.

In Example 4, the defocus power was 4.74 D, and the stray light ratio was 19.1%. Furthermore, the film thickness varied at the coating film convex portions in both the up-down direction and the left-right direction.

Example 5

The same test as in Example 4 was performed where the thickness of the coating film at the coating film base portion was 2.0 μm in Example 5, whereas the thickness of the coating film at the coating film base portion was 3.0 μm in Example 4.

In Example 5, the degree of variation in the thickness of the coating film was also checked as well as the measurement of the defocus power and the stray light ratio. However, checking was performed using a method that was different from the method described in the above embodiments and Example 1. The following gives a description.

A surface shape A of the lens substrate according to Example 5 was obtained using the device called Talysurf (registered trademark) CCI MP HS (manufactured by AMETEK Inc.). Also, a surface shape B of the eyeglass lens (after the coating film was formed) according to Example 5 was obtained using this device. Then, both shapes A and B were superimposed using software called TalyMap (registered trademark) (manufactured by AMETEK Inc.) such that the vertex of the substrate protruding portion in the surface shape A coincided with the vertex of the coating film convex portion in the surface shape B. Accordingly, the difference between the shapes A and B could be obtained. This difference is regarded as corresponding to the thickness of the coating film at at least a portion that corresponds to the base of the substrate protruding portion. Then, a cross-section passing through the center of the coating film convex portion was virtualized, and the value of the difference was obtained for every rotation angle in a plan view of the cross-section of the lens centered on the coating film convex portion.

FIG. 12 is a diagram showing a plot of the thickness of a coating film (vertical axis) for every rotation angle (horizontal axis) in a plan view of a cross-section of the lens at the base of the coating film convex portion in Example 5. Note that the upward direction, that is, the twelve-o'clock direction, is set to 0 degrees, and the rotation direction is set to be clockwise.

Note that the boundaries between the substrate base portion and the substrate protruding portions according to the examples in this specification were clear. Therefore, the base of the coating film convex portion defines a circumferential portion on the outermost surface of the eyeglass lens directly above the boundary in the Z-direction.

FIG. 13A is a diagram showing a plot of the thickness of the coating film on a cross-section of the lens in a left-right (horizontal) direction in Example 5.

FIG. 13B is a diagram showing a plot of the thickness of the coating film on a cross-section of the lens in the up-down direction in Example 5.

Points on the plot indicate the positions of the vertexes of the coating film convex portions.

Note that, because the measurement positions are shown on the vertical axis of the plot similar to that in FIGS. 13A-13B, the numerical values on the vertical axis need not be referenced. Instead, the difference values in the plot can be effectively referenced. An example of this difference value is the difference value between a vertical axis value, which is the largest value (and the maximal value), and a vertical axis value (or a vertical axis value that is the smallest value) at the vertex of the coating film convex portion.

As shown in FIGS. 12 and 13A-13B, it was clarified that the film thickness varied over the base of the coating film convex portion.

Example 6

An eyeglass lens was produced using the same method as in Example 1, except for the following changed points.

The range in which the substrate protruding portions were formed was changed from the lens center to inside a circle with a radius of 17 mm (however, excluding a regular hexagonal region whose inscribed circle is a circle with a radius of 3.8 mm from the lens center)

Figure 14:
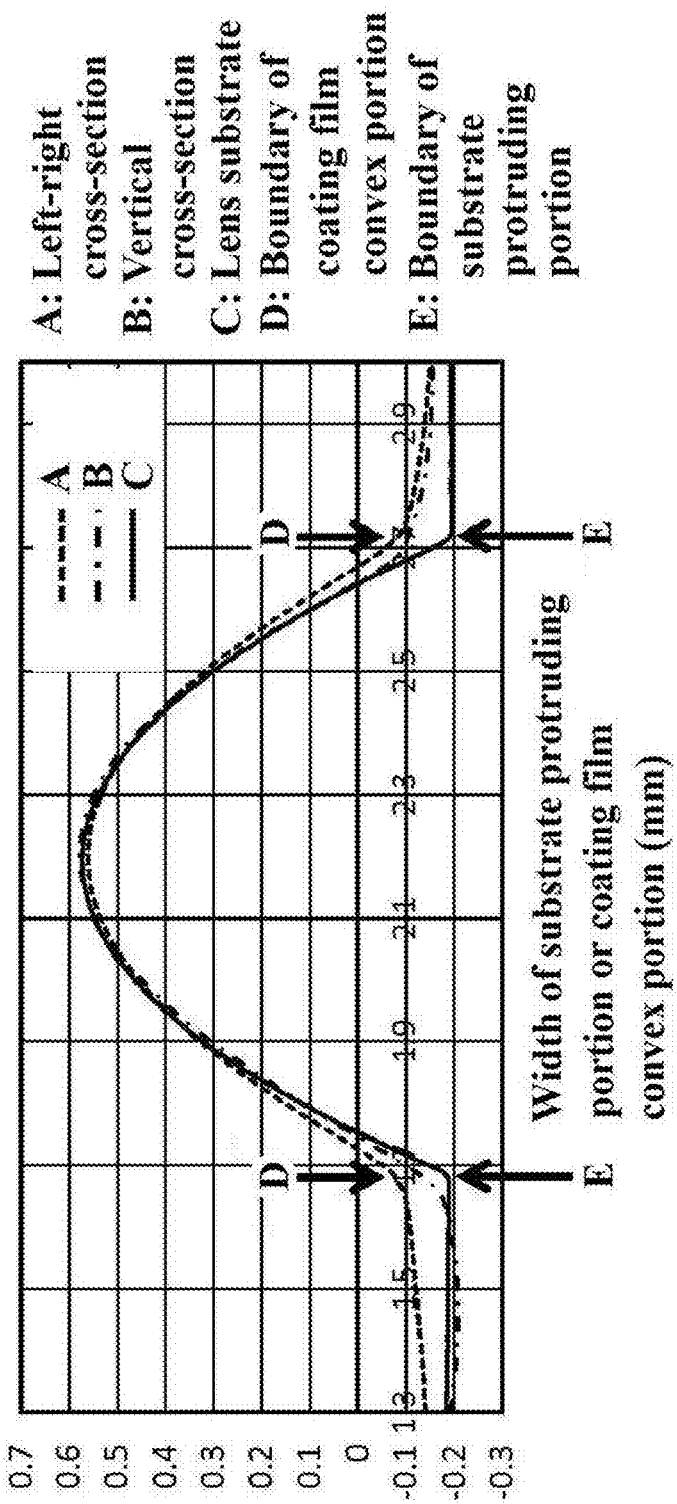
FIG. 14 is a diagram showing plots of the height of a substrate protruding portion, a coating film convex portion on a vertical cross-section of the coating film convex portion that is located directly upward of the lens center in the Y-direction and is the closest from the lens center, and the height of the coating film convex portion on a left-right (horizontal) cross-section in Example 6.

The height of the substrate protruding portions was changed such that the defocus power of the substrate protruding portion was 3.50 D Various conditions for the coating film liquid were changed such that the thickness of the coating film at the coating film base portion was 1.5 μm FIG. 14 is a diagram showing plots of the height of a substrate protruding portion, a coating film convex portion on a vertical cross-section of the coating film convex portion that is located directly upward of the lens center in the Y-direction and is closest from the lens center, and the height of the coating film convex portion on a left-right (horizontal) cross-section in Example 6.

In Example 6, the defocus power was 3.19 D, and the stray light ratio was 5.5%. Furthermore, the film thickness varied at the coating film convex portions in both the up-down direction and the left-right direction.

Example 7

The same test as in Example 6 was performed where the thickness of the coating film at the coating film base portion was 2.0 μm in Example 7, whereas the thickness of the coating film at the coating film base portion was 1.5 μm in Example 6.

Figure 15:
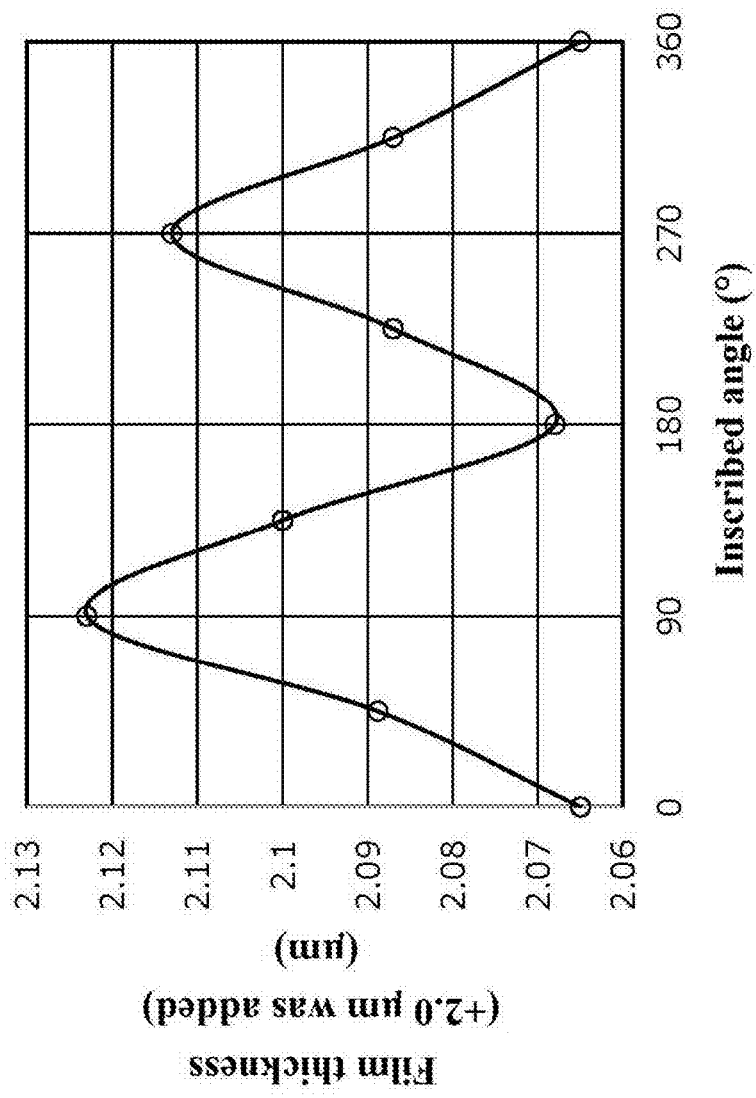
FIG. 15 is a diagram showing a plot of the thickness of a coating film (vertical axis) for every rotation angle (horizontal axis) in a plan view of a cross-section of a lens at the base of a coating film convex portion in Example 7.

FIG. 15 is a diagram showing a plot of the thickness of a coating film (vertical axis) for every rotation angle (horizontal axis) in a plan view of a cross-section of the lens at the base of the coating film convex portion in Example 7. Note that the upward direction, that is, the twelve-o'clock direction, is set to 0 degrees, and the rotation direction is set to be clockwise.

Note that the boundaries between the substrate base portion and the substrate protruding portions according to the examples in this specification were clear. Therefore, the base of the coating film convex portion defines a circumferential portion on the outermost surface of the eyeglass lens directly above the boundary in the Z-direction.

FIG. 16A is a diagram showing a plot of the thickness of the coating film on a cross-section of the lens in a left-right (horizontal) direction in Example 7.

FIG. 16B is a diagram showing a plot of the thickness of the coating film on a cross-section of the lens in the up-down direction in Example 7.

Points on the plot indicate the positions of the vertexes of the coating film convex portions.

As shown in FIGS. 15 and 16A-16B, it was clarified that the film thickness varied over the base of the coating film convex portion.

Example 8

An eyeglass lens was produced using the same method as in Example 1, except for the following changed points.

The range in which the substrate protruding portions were formed was changed from the lens center to inside a circle with a radius of 17 mm (however, excluding a regular hexagonal region whose inscribed circle is a circle with a radius of 3.8 mm from the lens center)

Figure 17A:
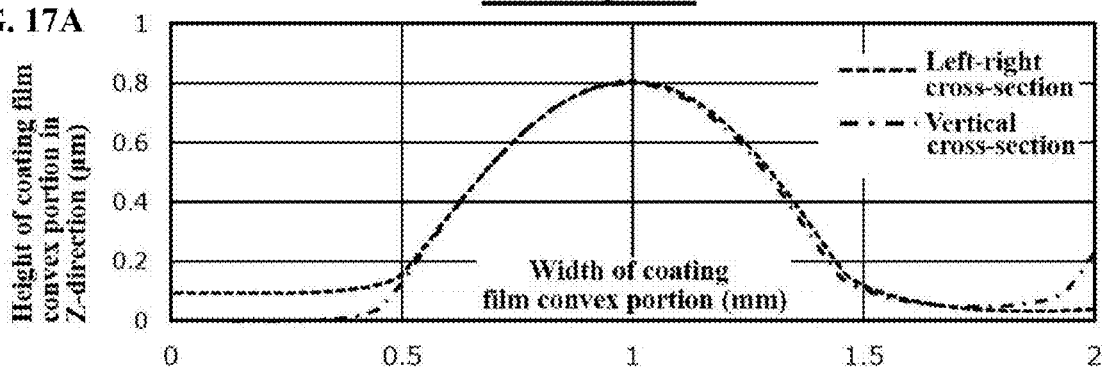
FIG. 17A is a diagram showing plots of the height of a coating film convex portion on a vertical cross-section of the coating film convex portion that is located directly upward of the lens center in the Y-direction and is the second closest from the lens center, and the height of the coating film convex portion on a left-right (horizontal) cross-section in Example 8.

FIG. 17A is a diagram showing plots of the height of a coating film convex portion on a vertical cross-section of the coating film convex portion that is located directly upward of the lens center in the Y-direction and is the second closest from the lens center, and the height of the coating film convex portion on a left-right (horizontal) cross-section in Example 8.

Figure 17B:
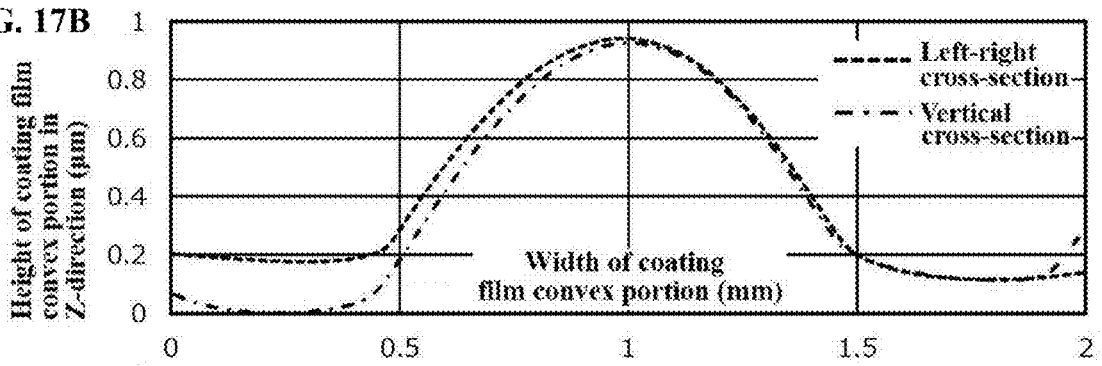
FIG. 17B is a diagram showing plots of the height of a coating film convex portion on a vertical cross-section of the coating film convex portion that is located directly upward of the lens center in the Y-direction and is the sixth closest from the lens center, and the height of the coating film convex portion on a left-right (horizontal) cross-section in Example 8.

FIG. 17B is a diagram showing plots of the height of a coating film convex portion on a vertical cross-section of the coating film convex portion that is located directly upward of the lens center in the Y-direction and is the sixth closest from the lens center, and the height of the coating film convex portion on a left-right (horizontal) cross-section in Example 8.

Figure 17C:
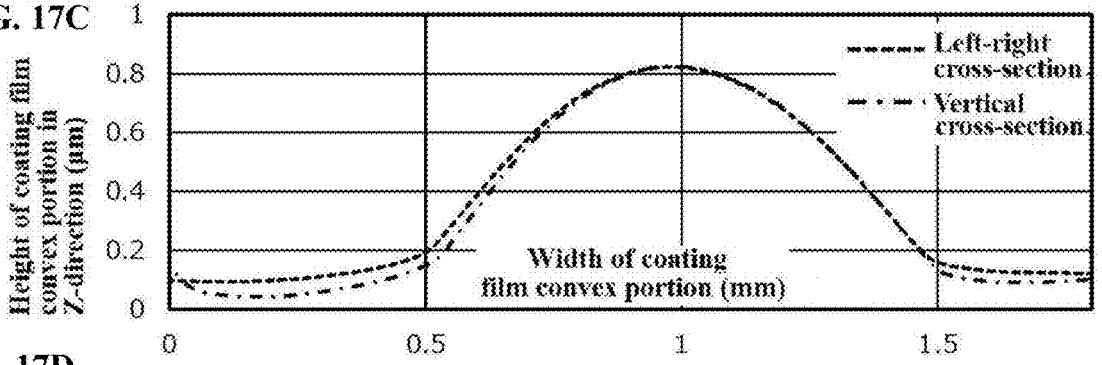
FIG. 17C is a diagram showing plots of the height of a coating film convex portion on a vertical cross-section of the coating film convex portion that is located horizontally leftward to the lens center and is the second closest from the lens center, and the height of the coating film convex portion on a left-right (horizontal) cross-section in Example 8.

FIG. 17C is a diagram showing plots of the height of a coating film convex portion on a vertical cross-section of the coating film convex portion that is located horizontally leftward to the lens center and is the second closest from the lens center, and the height of the coating film convex portion on a left-right (horizontal) cross-section in Example 8.

Figure 17D:
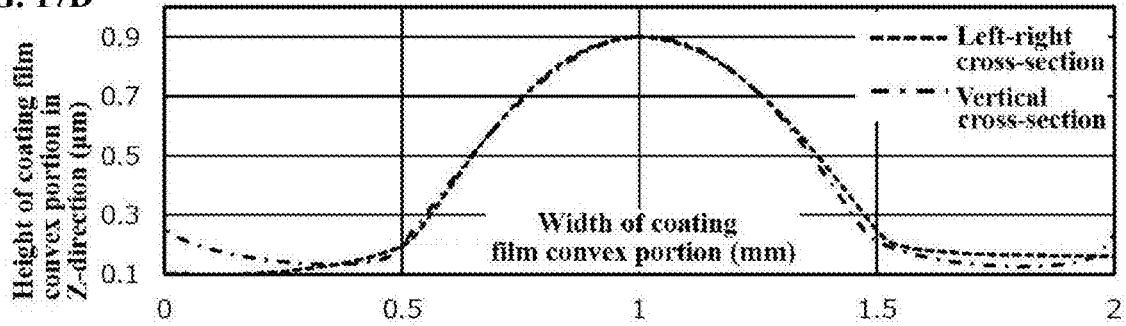
FIG. 17D is a diagram showing plots of the height of a coating film convex portion on a vertical cross-section of the coating film convex portion that is located directly downward of the lens center in the Y-direction and is the second closest from the lens center, and the height of the coating film convex portion on a left-right (horizontal) cross-section in Example 8.

FIG. 17D is a diagram showing plots of the height of a coating film convex portion on a vertical cross-section of the coating film convex portion that is located directly downward of the lens center in the Y-direction and is the second closest from the lens center, and the height of the coating film convex portion on a left-right (horizontal) cross-section in Example 8.

As shown in FIGS. 17A-17D, it was clarified that the film thickness also varied at the coating film convex portions at any position on the eyeglass lens.

The invention claimed is:

1. An eyeglass lens comprising:
    a lens substrate having a plurality of substrate protruding portions that protrude from a substrate base portion on a surface of the lens substrate; and
    a coating film provided so as to cover the plurality of substrate protruding portions,
    the outermost surface of the eyeglass lens having a plurality of convex portions and concave portions,
    wherein a thickness of the coating film varies over surrounding regions of the substrate protruding portions,
    wherein, in more than 50% of all of the coating film convex portions,
    when, on a plot with a rotation angle of 0 to 360 degrees on a horizontal axis and the thickness of the coating film on a vertical axis with respect to a base of the coating film convex portion, the angle at which the thickness of the coating film is at the smallest value is set as a rotation angle of 0 degrees,
    the film thickness that is larger than the smallest value and is at the minimal value is the film thickness at the base where the rotation angle is in a range of 165 to 195 degrees.

2. The eyeglass lens according to claim 1,
    wherein, when each substrate protruding portion is viewed in a plan view, the coating film is thin in a region extending in a predetermined direction in the surrounding region of the substrate protruding portion and a region extending in the opposite direction to the predetermined direction, and a portion with a thick coating film is present in a region extending in other directions.

3. The eyeglass lens according to claim 1,
    wherein, in more than 50% of all of the coating film convex portions,
    when, on a plot with a rotation angle of 0 to 360 degrees on a horizontal axis and the thickness of the coating film on a vertical axis with respect to a base of the coating film convex portion, the angle at which the thickness of the coating film is at the smallest value is set as a rotation angle of 0 degrees, the film thickness that is at the largest value and the maximal value is the film thickness at the base where the rotation angle is in a range of 50 to 110 degrees or the film thickness at the base where the rotation angle is in a range of 250 to 310 degrees, and the film thickness that is smaller than the largest value and is at the maximal value is present in a range of rotation angles where the largest value is not present.

4. The eyeglass lens according to claim 1, wherein a value obtained by dividing the smallest value of the thickness of the coating film extending over surrounding regions of more than 50% of all of the substrate protruding portions (at a rotation angle of 0 to 360 degrees) by the largest value of the thickness of the coating film (the smallest value/the largest value) is in a range of 0.10 to 0.99.

5. The eyeglass lens according to claim 1, wherein, on a cross-section of the lens that includes centers of more than 50% of all of the coating film convex portions, (the smallest value of difference values expressed by (the largest value of the thickness of the coating film−the thickness of the coating film at a vertex of the coating film convex portion))/(the largest value of difference values expressed by (the largest value of the thickness of the coating film−the thickness of the coating film at the vertex of the coating film convex portion)) is 0.90 or less.

6. The eyeglass lens according to claim 1, wherein the smallest value of the thickness of the film provided at bases of more than 50% of all of the substrate protruding portions is 0.01 to 2.00 times the film thickness of a coating film base portion.

7. The eyeglass lens according to claim 1, wherein defocus power of more than 50% of all of the coating film convex portions is in a range of 2.50 D to 6.50 D.

8. The eyeglass lens according to claim 1, wherein refractive power of more than 50% of all of the substrate protruding portions is in a range of 2.50 D to 6.50 D.

9. The eyeglass lens according to claim 1, wherein the thickness of the coating film of more than 50% of all of the coating film convex portions is in a range of 0.5 to 6.0 µm.

10. The eyeglass lens according to claim 1, wherein the eyeglass lens is able to suppress progression of near-sightedness.

11. A method of producing an eyeglass lens comprising:

a lens substrate having a plurality of substrate protruding portions that protrude from a substrate base portion on a surface of the lens substrate; and a coating film provided so as to cover the plurality of substrate protruding portions, the outermost surface of the eyeglass lens having a plurality of convex portions and concave portions, wherein a thickness of the coating film varies over surrounding regions of the substrate protruding portions, wherein, in more than 50% of all of the coating film convex portions, when, on a plot with a rotation angle of 0 to 360 degrees on a horizontal axis and the thickness of the coating film on a vertical axis with respect to a base of the coating film convex portion, the angle at which the thickness of the coating film is at the smallest value is set as a rotation angle of 0 degrees, the film thickness that is larger than the smallest value and is at the minimal value is the film thickness at the base where the rotation angle is in a range of 165 to 195 degrees.

* * * * *